(12) United States Patent
Baehr-Jones et al.

(10) Patent No.: US 10,120,212 B2
(45) Date of Patent: Nov. 6, 2018

(54) OPTICAL MODULATOR

(71) Applicant: Elenion Technologies, LLC, New York, NY (US)

(72) Inventors: Thomas Baehr-Jones, Arcadia, CA (US); Yang Liu, Elmhurst, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 15/876,623

(22) Filed: Jan. 22, 2018

(65) Prior Publication Data

US 2018/0210242 A1 Jul. 26, 2018

Related U.S. Application Data

(63) Continuation-in-part of application No. 15/481,669, filed on Apr. 7, 2017, now Pat. No. 9,910,302, which
(Continued)

(51) Int. Cl.
*G02F 1/035* (2006.01)
*G02F 1/025* (2006.01)
(Continued)

(52) U.S. Cl.
CPC .............. *G02F 1/025* (2013.01); *G02F 1/015* (2013.01); *G02F 1/2257* (2013.01); *G02F 1/01* (2013.01);
(Continued)

(58) Field of Classification Search
CPC ........ G02F 1/025; G02F 1/015; G02F 1/2257; G02F 1/01; G02F 1/011; G02F 1/035;
(Continued)

(56) References Cited

U.S. PATENT DOCUMENTS

| 7,085,443 B1* | 8/2006 | Gunn, III | ................. G02F 1/025 359/245 |
| 7,751,654 B2* | 7/2010 | Lipson | .................... G02F 1/025 385/1 |

(Continued)

OTHER PUBLICATIONS

Optimization of Ion Implantation Condition for Depletion-Type Silicon Optical Modulators by Yu et al.*
(Continued)

*Primary Examiner* — Thomas A Hollweg
*Assistant Examiner* — Guy Anderson
(74) *Attorney, Agent, or Firm* — Nixon Peabody LLP

(57) ABSTRACT

A novel phase shifter design for carrier depletion based silicon modulators, based on an experimentally validated model, is described. It is believed that the heretofore neglected effect of incomplete ionization will have a significant impact on ultra-responsive phase shifters. A low $V\pi L$ product of 0.3V·cm associated with a low propagation loss of 20 dB/cm is expected to be observed. The phase shifter is based on overlapping implantation steps, where the doses and energies are carefully chosen to utilize counter-doping to produce an S-shaped junction. This junction has a particularly attractive $V\pi L$ figure of merit, while simultaneously achieving attractively low capacitance and optical loss. This improvement will enable significantly smaller Mach-Zehnder modulators to be constructed that nonetheless would have low drive voltages, with substantial decreases in insertion loss. The described fabrication process is of minimal complexity; in particular, no high-resolution lithographic step is required.

15 Claims, 17 Drawing Sheets

Related U.S. Application Data is a continuation of application No. 14/840,409, filed on Aug. 31, 2015, now Pat. No. 9,638,942, which is a continuation of application No. 14/060,058, filed on Oct. 22, 2013, now Pat. No. 9,158,138.

(60) Provisional application No. 61/823,344, filed on May 14, 2013.

(51) Int. Cl.
*G02F 1/015* (2006.01)
*G02F 1/225* (2006.01)
*G02F 1/01* (2006.01)

(52) U.S. Cl.
CPC .............. *G02F 1/011* (2013.01); *G02F 1/035* (2013.01); *G02F 1/0353* (2013.01); *G02F 1/0356* (2013.01); *G02F 2001/0113* (2013.01); *G02F 2001/0152* (2013.01)

(58) Field of Classification Search
CPC ................. G02F 1/0353; G02F 1/0356; G02F 2001/0113; G02F 2001/0152
USPC ................. 385/1–3; 359/237–240, 245, 248, 359/250–252, 254–255
See application file for complete search history.

(56) References Cited

U.S. PATENT DOCUMENTS

| | | | |
|---|---|---|---|
| 8,019,185 B2* | 9/2011 | Yap | G02B 6/12007 385/1 |
| 8,380,016 B1* | 2/2013 | Hochberg | G02F 1/2257 385/131 |
| 8,994,107 B2* | 3/2015 | Bazizi | H01L 29/6659 257/344 |
| 2006/0133754 A1* | 6/2006 | Patel | G02B 6/122 385/129 |
| 2006/0215949 A1* | 9/2006 | Lipson | G02F 1/025 385/2 |
| 2008/0003704 A1* | 1/2008 | Katsuyama | B82Y 20/00 438/16 |
| 2008/0175549 A1* | 7/2008 | Uetake | B82Y 20/00 385/131 |
| 2009/0315135 A1* | 12/2009 | Finkelstein | H01L 31/107 257/438 |
| 2010/0060970 A1* | 3/2010 | Chen | G02F 1/025 359/245 |
| 2010/0080504 A1* | 4/2010 | Shetrit | G02B 6/12004 385/14 |
| 2012/0057815 A1* | 3/2012 | Ezaki | G02F 1/025 385/3 |
| 2012/0189239 A1* | 7/2012 | Tu | G02F 1/025 385/2 |
| 2014/0054679 A1* | 2/2014 | Tang | H01L 21/26586 257/329 |

OTHER PUBLICATIONS

Optimization of Ion Implantation Techniques for DepetionType Silicon Optical Modulators by Yu etal; published Nov. 15, 2010 in JQE-132400-2010.*

* cited by examiner

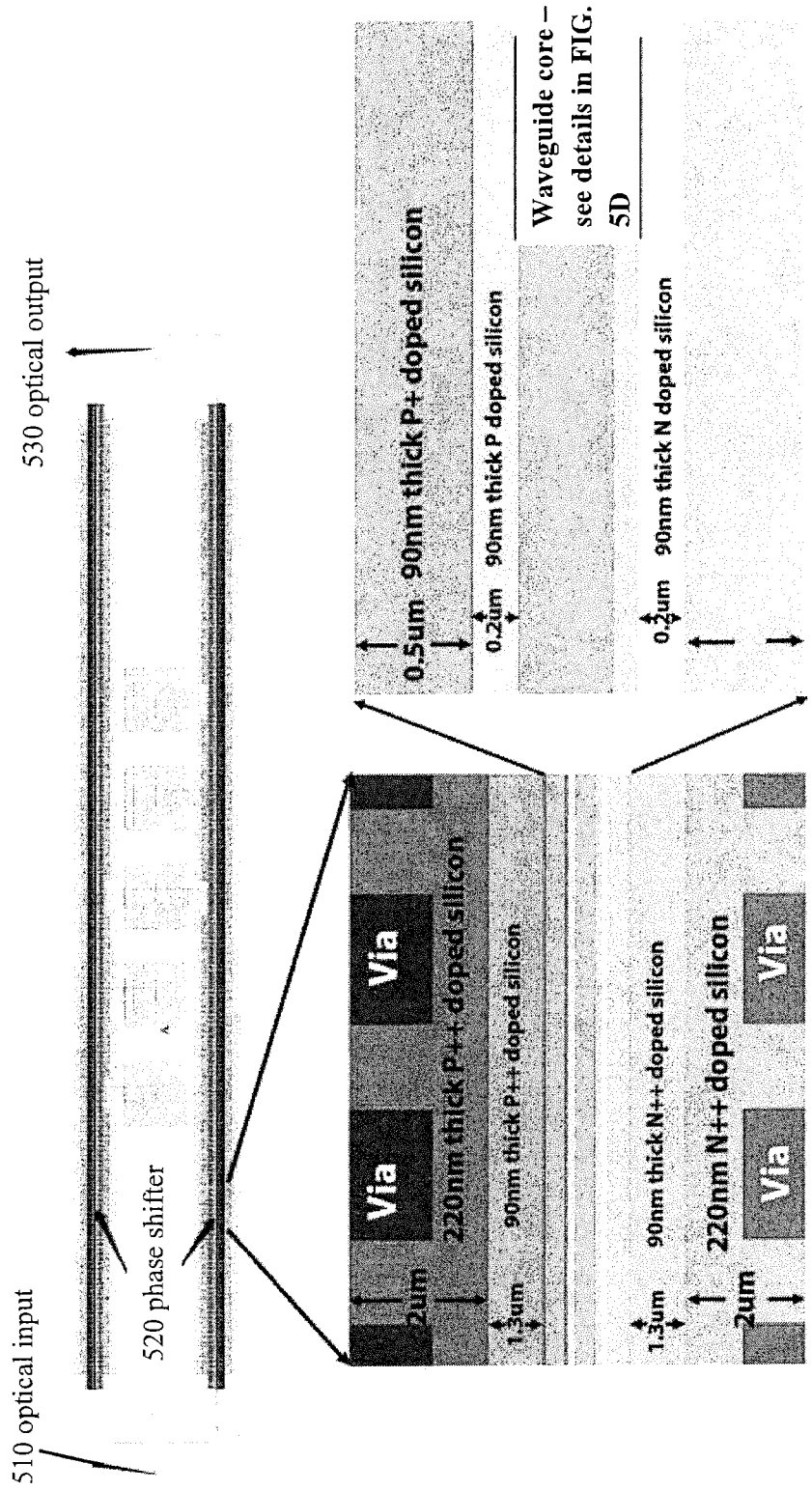

OPTICAL MODULATOR

CROSS-REFERENCE TO RELATED APPLICATIONS

This application is a continuation-in-part of pending U.S. patent application Ser. No. 15/481,669, filed on Apr. 7, 2017, titled "ULTRA-RESPONSIVE PHASE SHIFTERS FOR DEPLETION MODE SILICON MODULATORS", which is a continuation of U.S. patent application Ser. No. 14/840, 409, filed Aug. 31, 2015, now U.S. Pat. No. 9,638,942, which is a continuation of U.S. patent application Ser. No. 14/060,058 filed on Oct. 22, 2013, now U.S. Pat. No. 9,158,138, which claimed the priority to and the benefit of then U.S. provisional patent application Ser. No. 61/823, 344, filed May 14, 2013, each of which applications is incorporated herein by reference in its entirety.

FIELD OF THE INVENTION

The invention relates to phase shifters in general and particularly to optical phase shifters and optical modulators utilizing semiconductor PN junctions.

BACKGROUND OF THE INVENTION

In the past decade, there has been a rapidly growing need for communication bandwidth from high-performance computing and datacenters (see for example, G. T. Reed, G. Mashanovich, F. Y. Gardes, and D. J. Thomson, "Silicon optical modulators," Nat. Photonics 4(8), 518-526 (2010)). Silicon photonics technology has shown great potential to become a low cost and reliable solution for next generation interconnects due to its compatibility with CMOS technology (see for example, Y. A. Vlasov, "Silicon CMOS-integrated nano-photonics for computer and data communications beyond 100 G," IEEE Commun. Mag. 50(2), 67-72 (2012)). However, for silicon photonics technology to be widely adopted, a key challenge that needs to be addressed is achieving efficient and high-speed modulation in silicon, while consuming a minimal amount of die area. To minimize the optical and electrical power consumption, the silicon modulator is expected to have low insertion loss and driving voltage, while operating at high data rates (see for example, Miller, D. "Device requirements for optical interconnects to silicon chips". *Proc. IEEE* 97, 1166-1185 (2009)).

Today, carrier-depletion based modulators are among the most competitive approaches for data communication applications due to a relatively simple fabrication process and high operation speed. In this approach, a PN junction is formed inside a rib silicon waveguide by implantation. Optical modulation is obtained via the carrier dispersion effect (see for example, R. A. Soref, and B. R. Bennett, "Electrooptical effects in silicon," IEEE J. Quantum Electron. 23(1), 123-129 (1987)) by depleting the free carriers in the PN junction. The optical phase modulation can be converted to intensity modulation by structures such as Mach-Zehnder interferometer and ring resonator. Silicon modulators operating at 25 Gb/s and beyond has been demonstrated by several groups based on this idea (see for example, L. Liao, A. Liu, D. Rubin, J. Basak, Y. Chetrit, H. Nguyen, R. Cohen, N. Izhaky, and M. Paniccia, "40 Gbit/s silicon optical modulator for high-speed applications," Electron. Lett. 43(22), 1196-1197 (2007); T. Baehr-Jones, R. Ding, Y. Liu, A. Ayazi, T. Pinguet, N. C. Harris, M. Streshinsky, P. Lee, Y. Zhang, A. E. Lim, T. Y. Liow, S. H. Teo, G. Q. Lo, and M. Hochberg, "Ultralow drive voltage silicon traveling-wave modulator," Opt. Express 20(11), 12014-12020 (2012); M. Ziebell, D. Marris-Morini, G. Rasigade, J.-M. Fédéli, P. Crozat, E. Cassan, D. Bouville, and L. Vivien, "40 Gbit/s low-loss silicon optical modulator based on a pipin diode," Opt. Express 20(10), 10591-10596 (2012); D. J. Thomson, F. Y. Gardes, Y. Hu, G. Mashanovich, M. Fournier, P. Grosse, J.-M. Fedeli, and G. T. Reed, "High contrast 40 Gbit/s optical modulation in silicon," Opt. Express 19(12), 11507-11516 (2011); J. Ding, H. Chen, L. Yang, L. Zhang, R. Ji, Y. Tian, W. Zhu, Y. Lu, P. Zhou, R. Min, and M. Yu, "Ultra-low-power carrier-depletion Mach-Zehnder silicon optical modulator," Opt. Express 20(7), 7081-7087 (2012); Long Chen, Christopher R. Doerr, Po Dong, and Young-kai Chen, "Monolithic silicon chip with 10 modulator channels at 25 Gbps and 100-GHz spacing," Opt. Express 19, B946-B951 (2011); J. C. Rosenberg, W. M. J. Green, S. Assefa, D. M. Gill, T. Barwicz, M. Yang, S. M. Shank, and Y. A. Vlasov, "A 25 Gbps silicon microring modulator based on an interleaved junction," Opt. Express 20, 26411-26423 (2012); Xi Xiao, Hao Xu, Xianyao Li, Yingtao Hu, Kang Xiong, Zhiyong Li, Tao Chu, Yude Yu, and Jinzhong Yu, "25 Gbit/s silicon microring modulator based on misalignment-tolerant interleaved PN junctions," Opt. Express 20, 2507-2515 (2012); and Guoliang Li, Xuezhe Zheng, Jin Yao, Hiren Thacker, Ivan Shubin, Ying Luo, Kannan Raj, John E. Cunningham, and Ashok V. Krishnamoorthy, "25 Gb/s 1V-driving CMOS ring modulator with integrated thermal tuning," Opt. Express 19, 20435-20443 (2011)). A large fraction of these results are based on phase shifters with a simple PN junction geometry, either lateral or vertical inside a waveguide.

One important fact to note about current approaches is that the traveling-wave devices tend to be long—often several mm or more. This is due to the fairly weak electro-optic effect in silicon. It is possible to increase the phase shift per unit voltage (characterized by the FOM $V\pi L$) associated with the silicon pn-junction, but only by increasing the dopant concentration, which subsequently raises the waveguide loss. This fundamental tradeoff has been observed elsewhere (see for example, Hui Yu, Marianna Pantouvaki, Joris Van Campenhout, Dietmar Korn, Katarzyna Komorowska, Pieter Dumon, Yanlu Li, Peter Verheyen, Philippe Absil, Luca Alloatti, David Hillerkuss, Juerg Leuthold, Roel Baets, and Wim Bogaerts, "Performance tradeoff between lateral and interdigitated doping patterns for high speed carrier-depletion based silicon modulators," Opt. Express 20, 12926-12938 (2012); and Hui Yu; Bogaerts, W.; De Keersgieter, A., "Optimization of Ion Implantation Condition for Depletion-Type Silicon Optical Modulators," *Quantum Electronics, IEEE Journal of*, vol. 46, no. 12, pp. 1763,1768, December 2010), and a loss-efficiency figure of merit (see for example, Xiaoguang Tu, Tsung-Yang Liow, Junfeng Song, Mingbin Yu, and Guo Qiang Lo, "Fabrication of low loss and high speed silicon optical modulator using doping compensation method," Opt. Express 19, 18029-18035 (2011)) (F value) has been introduced to characterize the loss-$V\pi L$ trade off of the phase shifter. A phase shifter with lower F value is able to achieve the same $V\pi t$ with a lower optical insertion loss, which is highly desirable. Therefore, lower F values are better. So far in literature, the F value for a simple junction geometry that does not require high-resolution inter-digitation is typically 10~30 (see for example, Watts, M. R.; Zortman, W. A.; Trotter, D. C.; Young, R. W.; Lentine, A. L., "Low-Voltage, Compact, Depletion-Mode, Silicon Mach-Zehnder Modulator," *Selected Topics in Quantum Electronics, IEEE Journal of*, vol. 16, no. 1, pp. 159,164, January-February 2010), the lowest reported F value is 10.5 dB-V (see for example, Xi Xiao, Hao Xu, Xianyao Li, Zhiyong Li, Tao Chu, Yude Yu, and Jinzhong Yu, "High-speed, low-loss silicon Mach-Zehnder modulators with doping optimization," Opt. Express 21, 4116-4125 (2013)) with 1.5V·cm V$\pi$L.

Simply raising the dopant concentrations will actually lead to a less favorable F metric. However, more complex junction geometries such as interleaved junctions and "zig-zag" junctions (see for example, Xi Xiao; Xianyao Li; Hao Xu; Yingtao Hu; Kang Xiong; Zhiyong Li; Tao Chu; Jin-zhong Yu; Yude Yu, "44-Gb/s Silicon Microring Modulators Based on Zigzag PN Junctions," *Photonics Technology Letters, IEEE*, vol. 24, no. 19, pp. 1712,1714, Oct. 1, 2012)) exhibit more favorable F values. In these designs, the junction area per unit length is intentionally increased to enhance the carrier-light interaction. By this means, 0.24V·cm V$\pi$L with 16 dB/cm optical loss is theoretically predicted (see for example, Zhi-Yong Li, Dan-Xia Xu, W. Ross McKinnon, Siegfried Janz, Jens H. Schmid, Pavel Cheben, and Jin-Zhong Yu, "Silicon waveguide modulator based on carrier depletion in periodically interleaved PN junctions," Opt. Express 17, 15947-15958 (2009)) (F=3.84 dB-V). These are promising results, but to achieve this ultra low V$\pi$L, a 200 nm inter-digitation period is required; this will present difficulties as currently most silicon photonics implant layers are fabricated with lower-resolution masks. So far, the best V$\pi$L experimentally achieved in even a 193 nm lithography process is 0.62V·cm associated with 35 dB/cm optical loss (F=21.7 dB-V). Other methods like compensated doping and PIPIN junction geometry are also been explored in order to reduce the optical loss, however the V$\pi$L reported is still relatively high, with F values typically 19 dB-V or higher.

There is a need for optical modulators that did not require high-resolution lithography for their fabrication.

SUMMARY OF THE INVENTION

An aspect of the present disclosure relates to an optical modulator semiconductor device comprising an optical waveguide. The optical waveguide comprises a p-type region of semiconductor material and an n-type region of semiconductor material, the n-type region and the p-type region sharing a non-planar junction interface configured to increase a junction area between the n-type region and the p-type region per unit length of the optical waveguide so as to enhance an overlap between an optical mode in the optical waveguide and the junction area. The non-planar junction interface comprises a curved surface having a convex side and a concave side. In some implementations the p-type region is on the concave side of the non-planar junction interface and the n-type region is on the convex side of the non-planar junction interface. In some implementations the n-type region is on the concave side of the non-planar junction interface and the p-type region is on the convex side of the non-planar junction interface. In some implementations the p-type region is on the concave side of the non-planar junction interface at one location along the length of the optical waveguide, and is on the convex side of the non-planar junction interface at another location along the length of the optical waveguide.

An aspect of the present disclosure relates to an optical modulator comprising a substrate, an optical waveguide disposed upon the substrate and characterized by a width dimension, a length dimension, and a height dimension, the height dimension being perpendicular to the substrate. An n-type region of semiconductor material and a p-type region of semiconductor material are disposed within the optical waveguide and share a non-planar junction interface that is shaped so as to enhance an overlap between an optical mode in the optical waveguide and the junction interface when the optical modulator semiconductor device is operational. A portion of at least one of the p-type and n-type regions extends laterally between portions of the other of the p-type and n-type regions.

In some implementations the p-type region of the optical waveguide comprises a plurality of p-type protrusions spaced along the length dimension, each of the p-type protrusions interposed in the height dimension between portions of the n-type region, and the n-type region comprises a plurality of n-type protrusions interleaved with the p-type protrusions along the length dimension, each of the n-type protrusions interposed in the height dimension between portions of the p-type region.

In some implementations the optical waveguide includes a plurality of first implantation overlap regions spaced along the length dimension and comprising the p-type protrusion and a plurality of second implantation overlap regions interleaved with the first implantation overlap regions and comprising the n-type protrusion.

Another aspect of the present disclosure relates to a method of fabricating an optical modulator comprising: a) providing a semiconductor material upon a planar substrate; and, b) forming an optical waveguide with the semiconductor material, the optical waveguide comprising a p-type region and an n-type region defined therein so that at least one of the p-type region and the n-type region comprises a protrusion region interposed between portions of the other of the p-type region and the n-type region in a height dimension normal to the substrate, said protrusion region defining a non-planar junction interface between the n-type and p-type regions for enhancing an overlap between an optical mode of the optical waveguide and the non-planar junction interface.

In some implementations the method may include defining an implantation overlap region in the slab waveguide structure, with the step of implanting comprising: implanting the n-type dopants and the p-type dopants into the implantation overlap region at different energies so at to form a first dopant distribution within the implantation overlap region with two peaks in a direction normal to the substrate, and implanting the other of the n-type dopants and p-type dopants at a third energy so at to form a second dopant distribution in the implantation overlap region, the second dopant distribution having a peak that is located between the two peaks of the first dopant distribution in the direction normal to the substrate.

In some implementations the method may include defining an implantation overlap region in the slab waveguide structure, with the step of implanting comprising: implanting the n-type dopants and the p-type dopants into the implantation overlap region at different energies so at to form a first dopant distribution within the implantation overlap region with two peaks in a direction normal to the substrate, and implanting the other of the n-type dopants and p-type dopants at a third energy so at to form a second dopant distribution in the implantation overlap region, the second dopant distribution having a peak that is located between the two peaks of the first dopant distribution in the direction normal to the substrate.

In some implementations the method may include: defining, in the slab waveguide structure, one or more first implantation overlap regions and one or more second implantation overlap regions alternating with the first implantation overlap regions along the length of the waveguide; implanting n-type dopants into the first implantation overlap regions at two different energies so at to form, in each of the one or more first implantation overlap regions, an n-type dopant distribution with two peaks in a direction normal to the substrate, and implanting p-type dopants into the one or more first implantation overlap regions so at to form a p-type dopant distribution having a peak that is located between the two peaks of the n-type dopant distribution in the direction normal to the substrate; and, implanting p-type dopants into the one or more second implantation overlap regions at two different energies so at to form, in each of the one or more second implantation overlap regions, a p-type dopant distribution with two peaks in the direction normal to the substrate, and implanting n-type dopants into the one or more second implantation overlap regions so at to form an n-type dopant distribution having a peak that is located between the two peaks of the p-type dopant distribution in the direction normal to the substrate.

In some implementations the method may include a stage of implanting the n-type dopants and the p-type dopants into a plurality of first implantation overlap regions of the optical waveguide, the first implantation overlap regions spaced along a length dimension of the optical waveguide, at implantation energies selected so at to form, in each of the first implantation overlap regions of the optical waveguide, an NPN type structure in a height direction normal to the substrate. The method may further include a stage of implanting the n-type dopants and the p-type dopants into spaces between the first implantation overlap regions, said spaces defining a plurality of second implantation overlap regions, at implantation energies selected so at to form, in each of the second implantation overlap regions, a PNP type structure in the height direction.

In some implementations the method may include implanting n-type dopants and p-type dopants into a first implantation overlap regions of the optical waveguide so at to form an NPN type structure therein in a height direction normal to the substrate, and implanting the n-type dopants and the p-type dopants into a second implantation overlap region disposed sequentially with the first implantation overlap region so at to form therein a PNP type structure in the height direction.

Another aspect of the present disclosure relates to a method of fabricating an optical modulator semiconductor device using the steps of: providing a semiconductor material in planar form; forming a slab waveguide structure from the semiconductor material by an anisotropic etch; depositing a thin layer of an insulator conformally on top of the slab waveguide; implanting n-type and p-type dopants into the slab waveguide in multiple implantation steps to produce n-type and p-type regions, respectively; and annealing the implanted slab waveguide structure; thereby forming within the slab waveguide structure a p-type region and an n-type region, the n-type region and the p-type region having a non-planar junction interface having a length dimension, the non-planar common junction configured to increase a junction area between the n-type region and the p-type region per unit length of the length dimension of the junction, so as to so as to enhance an overlap between an optical mode in the optical waveguide and the junction area when the optical modulator semiconductor device is operational.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 5A is an illustration of a Mach Zehnder interferometer built using devices fabricated according to principles of the invention.

FIG. 5B is a diagram illustrating the detailed doping mask for the phase shifter, in which N and P implantations overlap in the center of the waveguide.

FIG. 5C is a diagram illustrating a more detailed view of a portion of the doping mask in FIG. 5B.

Figure 8:
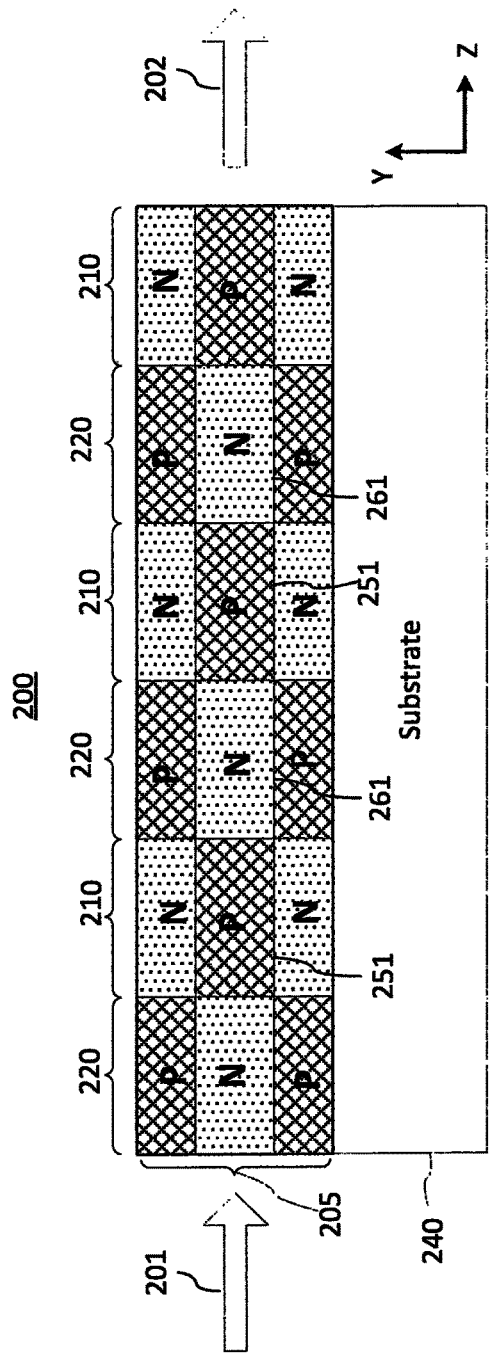
FIG. 8 is a schematic diagram showing p-type and n-type regions in a longitudinal cross-section for an embodiment of the phase shifter of FIGS. 1A and 4A with first regions of NPN doping profile interleaved along the length dimension with second regions of NPN doping profile.
Figure 9:
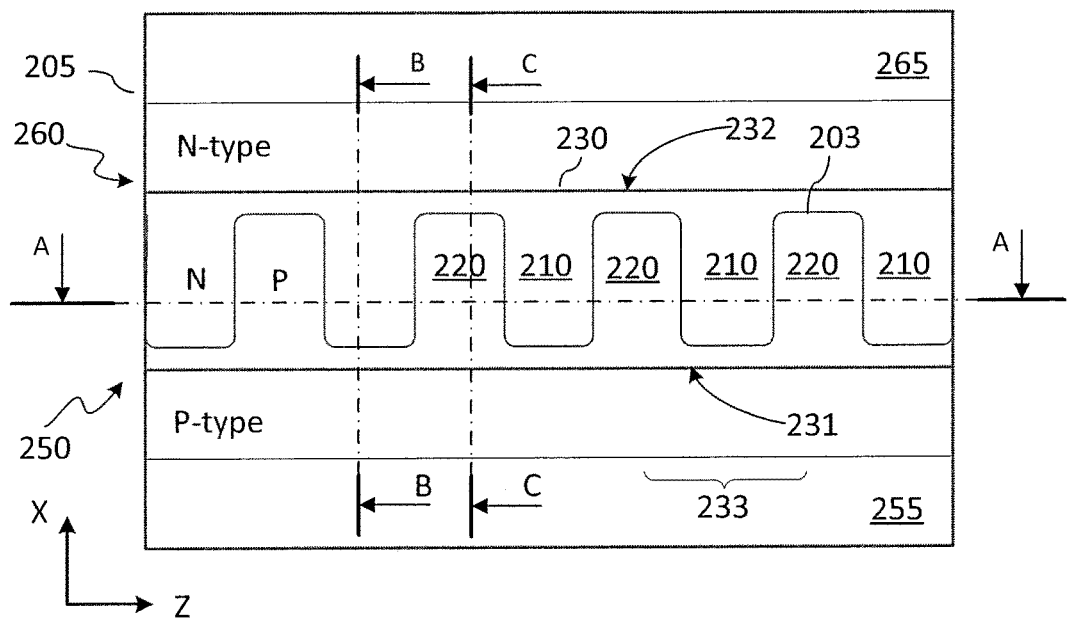
Figure 10:
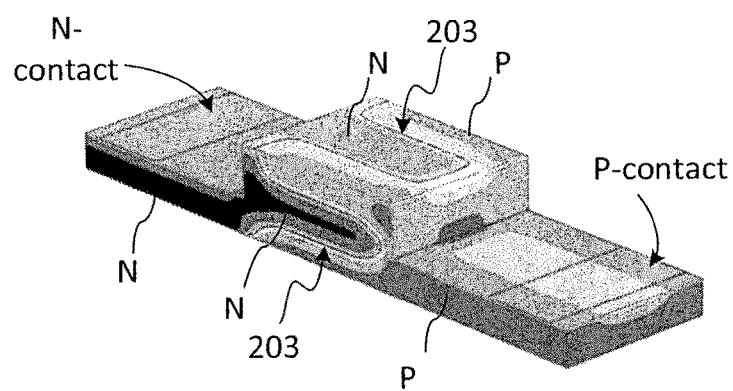
Figure 11:
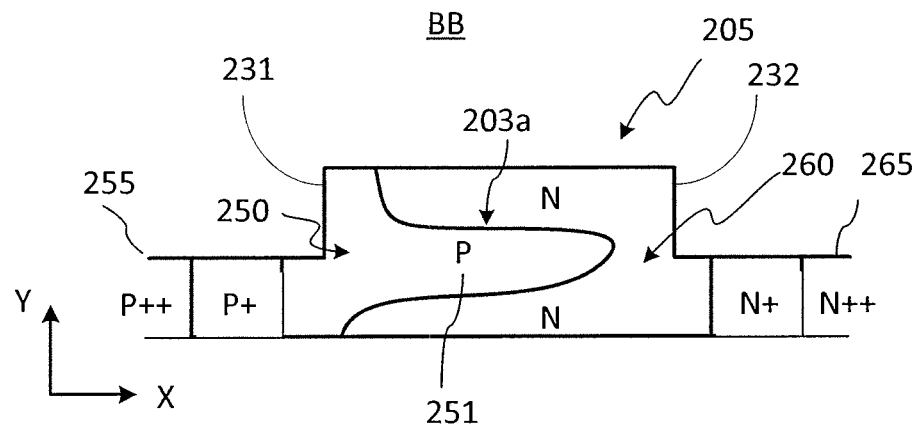
Figure 12:
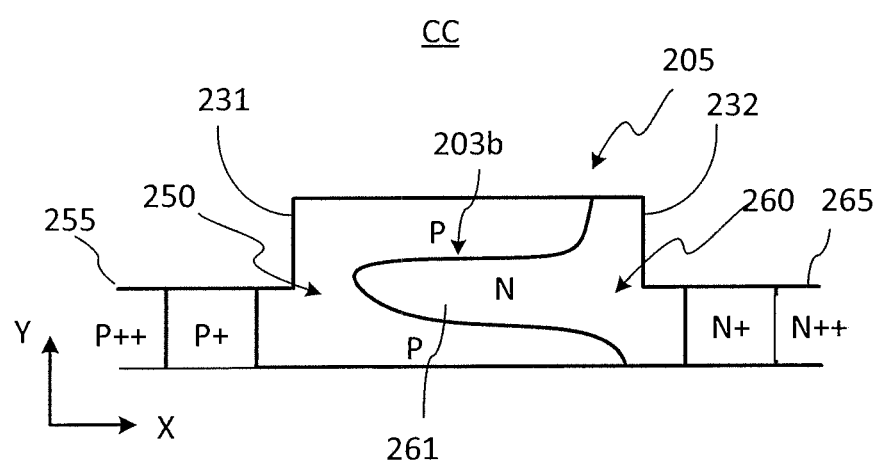
Figure 13B:
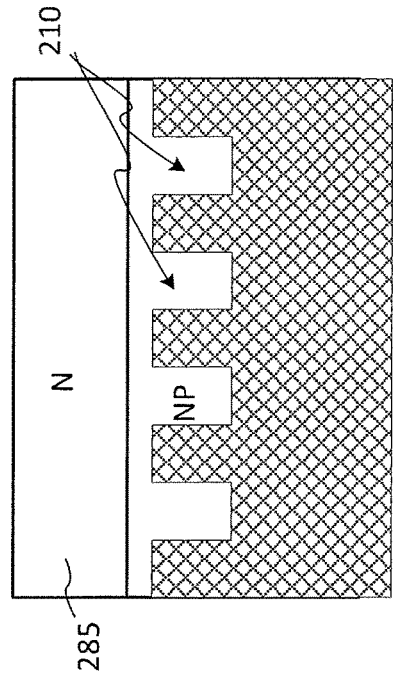
Figure 13D:
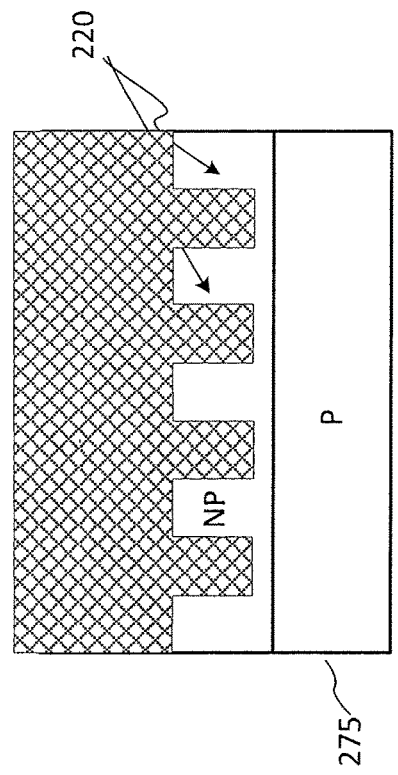
Figure 13A:
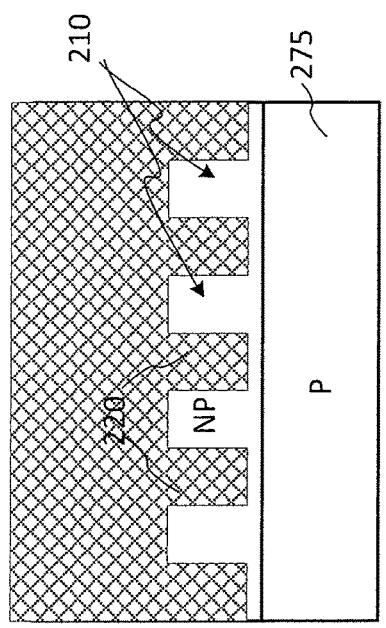
Figure 13C:
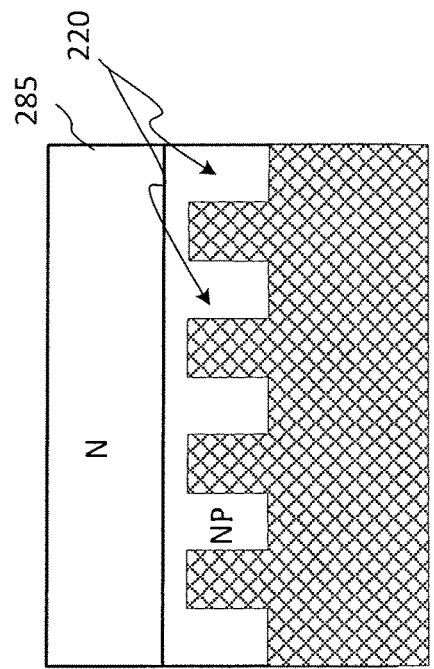

FOG. 9 is a schematic plan view of an embodiment of the phase shifting waveguide of FIG. 8 showing p-type and n-type regions at the top of the waveguide;

FIG. 10 is a side perspective view of a section of the phase shifting waveguide of FIG. 9 or 8;

FIG. 11 is a schematic diagram illustrating p-type and n-type regions in the B-B cross-section through one of the first regions of the phase shifting waveguide of FIG. 9;

FIG. 12 is a schematic diagram illustrating p-type and n-type regions in the C-C cross-section through one of the second regions of the phase shifting waveguide of FIG. 9;

FIG. 13A is a schematic diagram illustrating implantation shielding at a p-implantation step of a first stage of an example process of fabricating a waveguide with interleaved PNP and NPN regions;

FIG. 13B is a schematic diagram illustrating implantation shielding at an n-implantation step of the first stage of the example process of fabricating a waveguide with interleaved PNP and NPN regions;

FIG. 13C is a schematic diagram illustrating implantation shielding at a p-implantation step of a second stage of the example process of fabricating a waveguide with interleaved PNP and NPN regions;

FIG. 13D is a schematic diagram illustrating implantation shielding at an n-implantation step of the second stage of an example process of fabricating a waveguide with interleaved PNP and NPN regions.

DETAILED DESCRIPTION

Example embodiments of the present disclosure may be described hereinbelow with reference to silicon based depletion-mode optical modulators or phase shifters using slab waveguides. However, it will be appreciated that various aspects of the present disclosure are applicable to optical modulators or phase shifters based on semiconductor materials other than silicon and waveguide geometries other than slab waveguides, including but not limited to buried or non-buried ridge waveguides. The terms "phase shifter" and "optical modulator" are used herein interchangeably. The terms "PNP structure" and "PNP type structure" are used interchangeably to mean a region sequence wherein an n-type region is sandwiched between two p-type regions, possibly with depletion or intrinsic regions at the PN and NP interfaces. Similarly the terms "NPN structure" and "NPN type structure" are used interchangeably to mean a region sequence wherein a p-type region is sandwiched between two n-type regions, possibly with depletion or intrinsic regions at the PN and NP interfaces. N-type region means region doped with electron donor material (n-doped) and in operation having n-type conductivity. P-type region means region doped with electron acceptor material (p-doped) and in operation having p-type conductivity. The term PN junction encompasses PIN junctions.

At least some of the example embodiments described hereinbelow relate to a novel phase shifter design with a non-planar junction geometry that provides ultra low V$\pi$L of 0.3V·cm associated with only 20 dB/cm optical loss (F=6 dB-V). In some embodiments he fine structure of the junction geometry may be controlled by implantation conditions rather than lithography, minimizing the requirement on the resolution and thus the cost of the implantation masks.

In some embodiments the non-planar junction geometry may depend on the exact configuration of dopants in the final annealed silicon. When the dopant concentrations are relatively high, a number of effects that are generally neglected in implant design should be taken into account. In particular, surface segregation induced dose loss (See for example P. B. Griffin, S. W. Crowder, and J. M. Knight "Dose loss in phosphorus implants due to transient diffusion and interface segregation" Appl. Phys. Lett. 67, 482 (1995)), and implantation-based damage must be considered. We show SIMS data that confirms the significance of surface segregation, and allows us to calibrate our implant recipe to achieve the desired goal. Further, we note that incomplete ionization, a well-known effect in semiconductors at high dose levels (See for example, Wieslaw Kuźmicz, Ionization of impurities in silicon, Solid-State Electronics, Volume 29, Issue 12, December 1986, Pages 1223-1227; and S. M. Sze and K. K. Ng, *Physics of Semiconductor Devices*. New York: Wiley, 2007, pp. 79-90), must be considered. The effects of incomplete ionization are measured and help explain what would otherwise be a significant discrepancy as compared to experimental data we present hereinbelow. This effect has been ignored up until now in silicon depletion modulator design, as the impact has been small. However in more advanced junctions with more complex implant structures, a complete understanding of all of the effects we discuss will likely be important.

Principle of Operation

As discussed earlier, one way to improve the modulation efficiency of the silicon phase shifter without suffering from high optical loss is to increase the overlap between the optical mode and the depletion region, while keeping a moderate doping level. In example embodiments described hereinbelow, this goal is achieved by implementing novel junction geometry in the waveguide, with the junction line that may wrap around like an S shape. In other embodiments the junction may be shaped in a manner similar to the English letters "C" or "U" in various orientations. Comparing with a conventional lateral junction, the S shaped or C shaped junction geometry has a substantially larger surface area per unit length. In this way, a high modulation efficiency and relatively low optical loss can be achieved simultaneously. It is anticipated that this modulation will be operated by reverse-biasing the PN junction to alter the depletion region size, thus achieving modulation. We first describe how this S junction or C junction can be fabricated in a photonics foundry, and then explain the steps of an example fabrication process in detail.

Optical modulation will be achieved for radiation with free-space wavelengths near 1550 nm and 1310 nm based on the free-carrier plasma dispersion effect and reverse biasing the pn junction diode intrinsic to the PN interface. The modulation effect will be enhanced by a maximization of the overlap between the optical mode in a waveguide and the junction geometry, as shown in FIG. 1A.

Figure 1A:
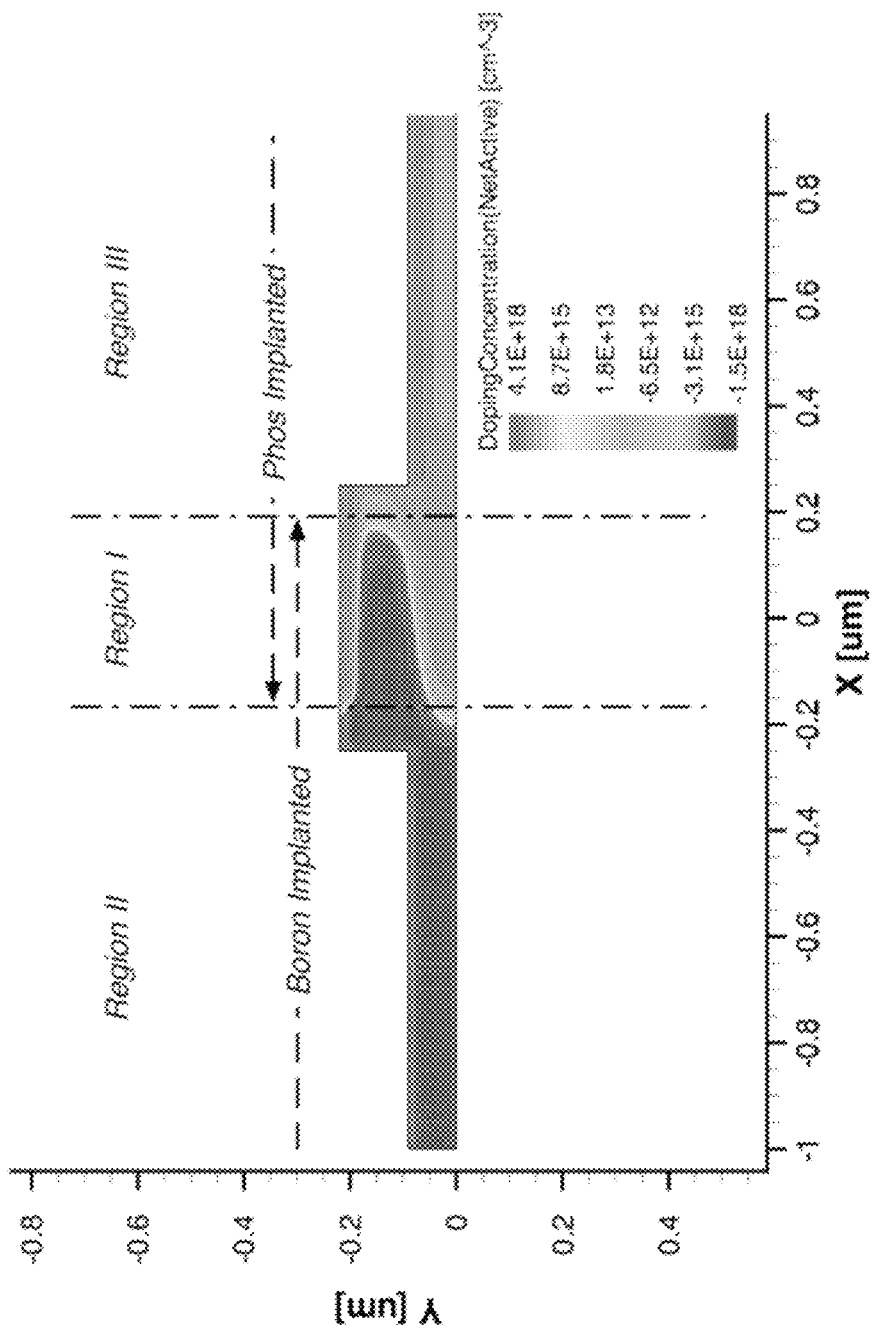
FIG. 1A is a schematic diagram showing a simulated dopants distribution on the cross-section of the phase shifter, following the implantation and annealing conditions listed in Table 1.

FIG. 1A is a schematic diagram showing a simulated dopants distribution on the cross-section of a phase shifter implemented as a slab waveguide, following the implantation and annealing conditions listed in Table 1. X-axis corresponds to a width dimension of the waveguide that may also be referred to herein as the lateral dimension, and Y-axis corresponds to a height dimension of the waveguide.

Figure 1B:
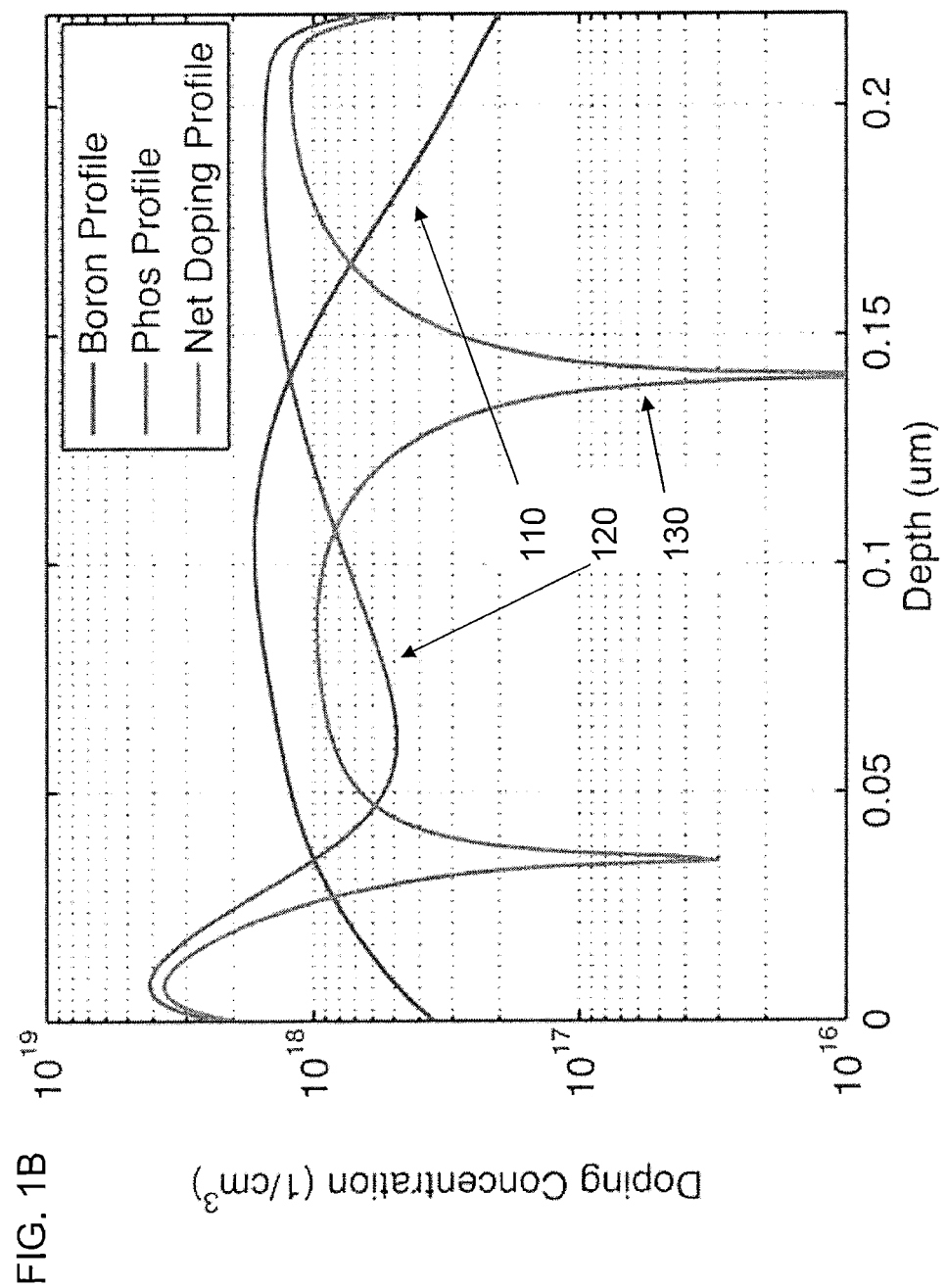
FIG. 1B is a graph showing the depth profiles of boron (curve 110), phosphorus (curve 120) and the net profile (curve 130) in a section through Region I of FIG. 1A.

FIG. 1B is a graph showing the depth profiles of boron (curve 110), phosphorus (curve 120) and the net profile (curve 130) in a section through Region I of FIG. 1A.

In one example embodiment the fabrication may start from an SOI wafer with a 220 nm top silicon layer and a 2 µm buried oxide layer (BOX). A silicon slab waveguide structure may be defined by a 130 nm deep anisotropic etch. The resulted slab waveguide has 500 nm width, 220 nm rib height and 90 nm slab height; all numerical values are by way of example only and other geometric parameters may be used. After the etching, a thin layer (10 nm) of $SiO_2$ is conformally deposited on top of the silicon surface to minimize the channeling effect in the following implantation steps. Multiple implantation steps are then performed with implantation conditions listed in Table I also by way of example. Boron and phosphorus beams are implanted into the wafer from four cardinal directions, with different tilt angles. In steps 1-4, 7° tilt angle is used to minimize the ion channeling effect. In step 5, 45° tilt angle is used to implant the right side wall of the waveguide with phosphorus, in order to ensure electrical connectivity along the sidewall. After the implantation, a 5 second rapid thermal annealing (RTA) step at 1030° C. is used to activate the dopants. The distribution of dopants on a cross-section of the phase shifter is simulated with a semiconductor process simulator Sentaurus Process, and plotted in FIG. 1B. While specific implant energies are listed in Table I, it is known that the implantation can be done with other, slightly modified energies, and still obtain a useful outcome. For example, one can do step 2 at 33 KeV rather than the 32 KeV energy listed in Table 1.

TABLE 1

Implantation Conditions for Baseline design

| Step | Species | Energy/ KeV | Dose/cm$^2$ | Implantation Window | Tilt Angle |
|---|---|---|---|---|---|
| 1 | Boron | 14 | $3.5 \times 10^{12}$ | (−1, 0.15) | 7 |
| 2 | Boron | 32 | $2.0 \times 10^{13}$ | (−1, 0.15) | 7 |
| 3 | Phos | 160 | $3.0 \times 10^{13}$ | (−0.15, 1) | 7 |
| 4 | Phos | 15 | $1.0 \times 10^{13}$ | (−0.15, 1) | 7 |
| 5 | Phos | 10 | $7.0 \times 10^{12}$ | (−0.15, 1) | 45 |
| 6 | RTA | 1030° C. | 5 s | | |

In the above recipe, the rib height and slab height of the silicon waveguide are chosen as typical values provided by photonics foundry today for simplicity (see for example, R. Ding, T. Baehr-Jones, T. Pinguet, J. Li, N. C. Harris, M. Streshinsky, L. He, A. Novack, E. Lim, T. Liow, H. Teo, G. Lo, and M. Hochberg, "A Silicon Platform for High-Speed Photonics Systems," in Optical Fiber Communication Conference, OSA Technical Digest (Optical Society of America, 2012), paper OM2E.6). Waveguides of different height may require different implantation energies. The S shaped or C shaped junction geometry in the waveguide is achieved by carefully controlled implantation conditions. First of all, the depth (vertical direction in the waveguide that is typically perpendicular to the substrate) profiles of boron and phosphorus are designed as follows. Phosphorus is implanted with a high energy and a low energy step so the profile has two peaks, one near the top of the waveguide, and the other near the bottom. The main dose of boron is implanted with a single energy so the profile only shows one peak in the middle of the waveguide. Second, in the lateral direction, the implantation windows of boron and phosphorus are designed to have an overlap region in the core of the waveguide.

We utilize a technique in our junction known as counter-doping (see for example, J. D. Plummer, Michael Deal, and P. D Griffin "Silicon VLSI Technology: Fundamentals, Practice, and Modeling", Prentice-Hall, 2000). In this technique, both acceptors (boron) and donors (phosphorus or arsenic) are implanted into silicon and the polarity of the silicon is finally determined by the difference between the acceptor and donor concentration. Silicon will appear to be p type if the acceptor concentration exceeds the donor concentration, and will appear to be n-type if the donor concentration exceeds the acceptor concentration. When applying this technique to an optical device, it is desirable to maintain the single crystalline property of the waveguide, which may require the accumulated damage in the implantation process to be less than the amorphous threshold of $5 \times 10^{21}$ defects/cm$^3$.

In one embodiment the process of forming the S shaped or C-shaped junction geometry can be understood as follows. With regard to FIG. 1A, in the lateral direction (x direction), the slab waveguide is divided into 3 regions by the implantation masks of boron and phosphorus. Region I is exposed to both boron and phosphorus implantation. As illustrated in FIG. 1B, because in the vertical direction, phosphorus concentration (curve 120) exceeds boron (curve 110) near the top and bottom of the waveguide, while boron concentration exceeds phosphorus near the middle of the waveguide, the middle part of the waveguide will appear to be P type, while the top and bottom part of the waveguide will be N type. Region II, including the left edge of the phase shifter, and the left side of the silicon slab is P type doped, because it's only exposed to boron implantation. On the other hand, region III, including the right edge of the waveguide core and right side of the silicon slab is N type doped since it's exposed to only phosphorus implantation. Region II and III act as electrical paths that connect the junction region and the electrodes. After annealing, a curved junction line 103 indicating a non-planar PN junction interface will form between the N and P type doped region, wrapping in the center of the waveguide about a protrusion 101 of the P type doped region into the N-type doped region, forming a PNP structure along the waveguide depth dimension (Y-axis) in the implantation overlap region I.

The following notes may be made with respect to the implantation process. First of all, it's reported that in the RTA step, the phosphorus atoms can be trapped in the Si/SiO$_2$ surface due to surface segregation. This effect may cause a loss of phosphorus dose, and thus a decreased phosphorus concentration near the top of the waveguide. To counteract, the dose of the low energy phosphorus implantation step may be intentionally increased to compensate for the surface segregation, and ensure the top part of the silicon rib is N type. Second, in the P/N implantation overlap region I the damage due to boron and phosphorus implantation may accumulate. It is desirable to keep the accumulated damage after the implantation steps below the silicon amorphous threshold $5 \times 10^{21}$/cm$^3$. Otherwise, the silicon layer may be amorphorized, and will be hard to heal in the annealing step, potentially causing extra optical loss.

Figures 2A, 2B:
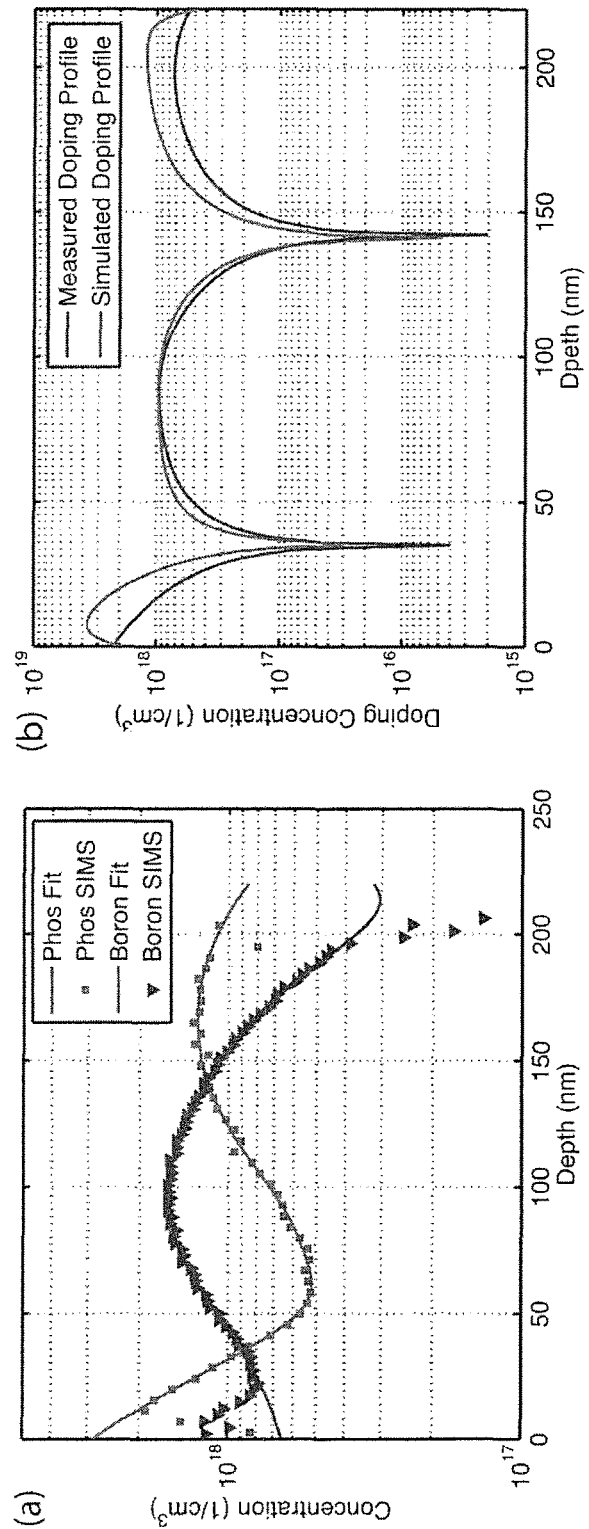
FIG. 2A is a graph showing the boron (triangles) and phosphorus (squares) concentration as a function of depth measured by SIMS. Multiple peak Gaussian functions are used to fit the data points.
FIG. 2B is a graph of the measured and designed net doping profile.

The example implantation process described is designed to provide the S shaped or C shaped junction line 103, with two PN junctions at different depth formed in the region where the boron and phosphorus implantation overlaps. An implantation experiment was performed to verify the profile design. In the implantation experiment, boron and phosphors were uniformly implanted into a SOI wafer with a 220 nm thick top silicon layer and a 10 nm thick screening SiO$_2$ layer without any masking. The etching step was not performed to define the waveguide structure, making it easier to measure the depth doping profile. The implantation and annealing steps are the same as listed in Table I. After annealing, the 10 nm screening SiO$_2$ layer was removed. Secondary Ion Mass Spectrometry (SIMS) analysis was performed to characterize the boron and phosphorus concentration as a function of depth. The boron and phosphorus profiles were extracted by fitting the SIMS data with multiple peak Gaussian functions as shown in FIG. 2A. SIMS data near the top surface (~20 nm) of the silicon is inaccurate because the rapidly changing surface chemistry leads to an unstable ion yield. Therefor these data points were excluded from the fit. The SIMS measured net doping profile and the designed profile is shown in FIG. 2B. As we can see clearly, two PN junctions are formed in silicon at about 35 nm and 140 nm from the surface. The top region (0~35 nm) and bottom region (140~220 nm) are N type doped, while the middle region (35~140 nm) is P type doped. As shown in FIG. 2B, a measured doping profile and a simulated doping profile are in good agreement. With this depth profile, it is expected that when the same implantation recipe is applied on a slab waveguide with the designed masking window, the desired S junction geometry can be formed successfully.

Phase Shifter Performance

We now present an analysis of the performance of the S junction phase shifter design. The important metrics for a phase shifter includes modulation efficiency (VπL), optical loss, and electrical characteristics such as junction capacitance and resistance. Here we present a simulation technique to accurately predict the performance of a silicon phase shifter by combined semiconductor process simulation, electrical device simulation and optical mode solving. The model is first calibrated experimentally on a lateral junction silicon phase shifter, and then used to analyze the performance and tradeoffs of the S junction phase shifter design.

Simulation Method

The simulation flow starts from semiconductor process simulation. Sentaurus Process (modeling tools available from Synopsys, Inc., 700 East Middlefield Rd., Mountain View, Calif. 94043-4033 U.S.A.) is used to model the etching, implantation, and annealing steps of the phase shifter fabrication. In the end of the process simulation, a virtual phase shifter model containing the information of waveguide geometry and spatial distribution of dopants is created. Next, the virtual phase shifter model is solved using a finite element semiconductor device solver Sentaurus Device (modeling tools available from Synopsys, Inc., 700 East Middlefield Rd., Mountain View, Calif. 94043-4033 U.S.A.) under different bias voltages. The distribution of free electrons and holes is obtained by solving the Poisson equation fully coupled to electron and hole current continuity equation. A small signal AC simulation is performed to extract the capacitance of the structure at each bias voltage. During the device simulation, the following physics models are used:

1. Mobility models including doping dependence and high-field saturation;
2. Shockley-Read-Hall recombination with doping-dependent lifetime; and
3. The incomplete ionization model.

After the device simulation is complete, the electrical characteristics such as junction capacitance and parasitic resistance are fully determined. To calculate the modulation efficiency and optical propagation loss of the virtual phase shifter, an optical mode solver is employed to compute the transverse optical mode in the waveguide. The mode solver takes the simulated waveguide geometry as input, and assumes that no free carriers are present in the waveguide. This is a good approximation because the change of refractive index induced by free carriers is tiny (<0.1%) compared to the refractive index of silicon. In the presence of free carriers, the local change of refractive index at 1.55 um wavelength is predicted by the plasma dispersion formula:

$$\Delta n(x,y) = -8.8 \times 10^{-22} \Delta N_e(x,y) - 8.5 \times 10^{-18} \Delta N_h(x,y)^{0.8}$$

$$\Delta \alpha(x,y) = 8.5 \times 10^{-18} \Delta N_e(x,y) + 6.0 \times 10^{-18} \Delta N_h(x,y) \quad (1)$$

where $\Delta N_e(x,y)$ and $\Delta N_h(x,y)$ are the free electron and hole contribution obtained from the device simulation. Knowing the local change of refractive index and optical loss on the cross-section of a waveguide, the overall change of the effective index and optical loss of the waveguide can be derived by applying the mode perturbation theory (see for example, Baehr-Jones, T.; Hochberg, M.; Walker, C.; Eric Chan; Koshinz, D.; Krug, W.; Scherer, Axel, "Analysis of the tuning sensitivity of silicon-on-insulator optical ring resonators," *Lightwave Technology, Journal of*, vol. 23, no. 12, pp. 4215,4221). We obtain as a result:

$$\Delta n_{eff} = \frac{n_{si} \int\int_{si} \Delta n(x,y) |\vec{E}(x,y)|^2 dxdy}{Z_0 \int\int Re(\vec{E} \times \vec{H}^*) dxdy} \quad (2)$$

$$\Delta \alpha = \frac{n_{si} \int\int_{si} \Delta \alpha(x,y) |\vec{E}(x,y)|^2 dxdy}{Z_0 \int\int Re(\vec{E} \times \vec{H}^*) dxdy}$$

Here, $n_{si}=3.48$ denotes the refractive index of crystalline silicon at 1.55 um, and $Z_0=377\Omega$ denotes the impedance of free space. E(x,y) and H(x,y) are the transverse model profile of the unperturbed waveguide. Note after carrying out the overlap integral (2), the change of effective index and optical loss is only a function of bias voltage applied on the electrodes, which is implicitly contained in the distribution of free electrons and holes. The effective index change can be readily converted to the modulation efficiency figure of merit VπL of the phase shifter. We follow the small signal VπL definition from −0.5V to 0.5V.

It's worth mentioning, in the modeling of the phase shifter, the incomplete ionization (I.I) plays an important role. At room temperature, a fraction of the dopant atoms will not be ionized even if almost 100% of the dopants are electrically activated after implantation. This is a result of the Fermi statistics. Basically, when silicon is heavily doped, and the Fermi level comes close to the impurity energy level, some of the donor/acceptor states will be occupied by an electron/hole, respectively, so that they no longer act as donors/acceptors. For the doping level near 1E18 (1×10$^{18}$), only about 80% of the dopants are ionized at room temperature (see for example, Altermatt, P.P.; Schenk, A.; Schmithusen, B.; Heiser, G., "A simulation model for the density of states and for incomplete ionization in crystalline silicon. II. Investigation of Si:As and Si:B and usage in device simulation," *Journal of Applied Physics*, vol. 100, no. 11, pp. 113715,113715-7, December 2006), which means the free carrier concentration may 20% lower than what we usually assume (100% ionization), causing the model without I.I to deviate from experiment.

Interestingly, some electrical properties like PN junction capacitance and conductively of doped silicon are not affected by I.I. For the junction capacitance, because the Fermi level in the depletion region is far away from the impurity level, essentially 100% ionization occurs. Thus the depletion width will not be affected by the I.I. For the conductivity, the I.I effect is absorbed in the measured mobility value, so no correction on carrier concentration is needed.

Simulation Model Calibration

To verify the accuracy of the modeling technique presented above, we fabricated silicon phase shifters based on lateral PN junctions. VπL, optical loss, and junction capacitance are experimentally measured, and compared with the simulation model.

The phase shifters were fabricated on SOI wafer with 220 nm top silicon and 2 μm BOX. The 500 nm wide waveguide was patterned and formed by an anisotropic partial silicon etch, leaving a 90 nm thick silicon layer in the strip load region. Then the waveguide was implanted by boron with the right half covered by photo resist. Similarly, the right half of the waveguide was implanted by phosphorus with the left half covered. The lateral PN junction is designed to have a nearly uniform doping concentration of $2\times10^{18}/cm^3$ on the P side and $3\times10^{18}/cm^3$ on the N side. The whole structure was then annealed in an RTA step similar to that described previously. The details of the implantation steps and the RTA step are listed in Table 2.

TABLE 2

Implantation and annealing conditions of a lateral junction phase shifter

| Step | Species | Energy/ KeV | Dose/cm$^2$ | Implantation Window | Tilt Angle |
|------|---------|-------------|-------------|---------------------|------------|
| 1 | Boron | 10 | $1.2 \times 10^{13}$ | (−1, 0) | 0 |
| 2 | Boron | 35 | $3.0 \times 10^{13}$ | (−1, 0) | 0 |
| 3 | Phos | 40 | $2.5 \times 10^{13}$ | (0, 1) | 0 |
| 4 | Phos | 135 | $6.0 \times 10^{13}$ | (0, 1) | 0 |
| 5 | RTA | | 1030° C. | 5 s | |

The performance of the phase shifter was characterized experimentally based on two types of structures. First, unbalanced Mach-Zehnder interferometers with phase shifters loaded in both arms were used to measure the VπL and junction capacitance of the phase shifter. The DC phase shift is measured by applying a bias voltage on one arm of the MZ and recording the change of transmission spectrum. The junction capacitance on the phase shifter is determined by the phase of S11 parameter on the MZI and a metal de-embedding structure similar to the methods described in T. Baehr-Jones, R. Ding, Y. Liu, A. Ayazi, T. Pinguet, N. C. Harris, M. Streshinsky, P. Lee, Y. Zhang, A. E. Lim, T. Y. Liow, S. H. Teo, G. Q. Lo, and M. Hochberg, "Ultralow drive voltage silicon traveling-wave modulator," Opt. Express 20(11), 12014-12020 (2012). A single phase shifter structure with electrodes is fabricated to characterize the optical loss at different bias voltage. A control structure with the same waveguide length but no P/N implantation is measured at the same time as a reference.

Figure 3A:
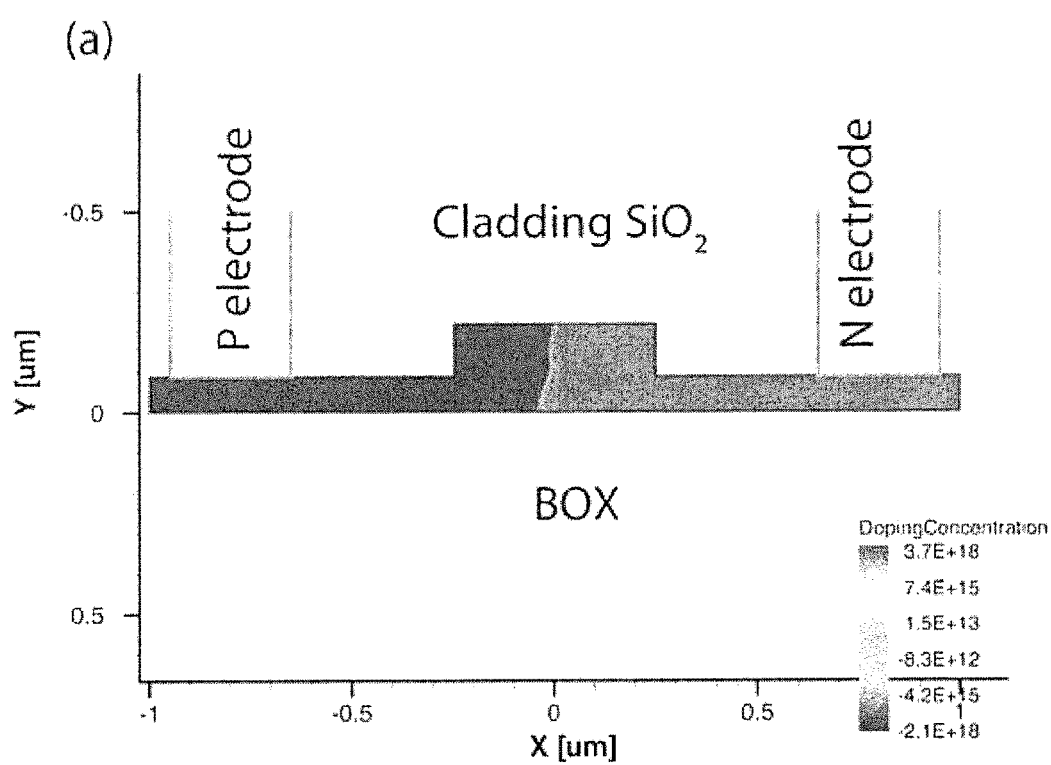
FIG. 3A is a diagram showing the non-planar doping profile of the cross-section of the lateral junction phase shifter.

The test result and comparison with the simulation model is presented in FIG. 3A through FIG. 3D. The example shown in FIG. 3A is a test profile that had a non-planar region with an overlap of tens of nanometers rather than hundreds of nanometers as depicted in FIG. 1A and FIG. 4A. This test structure was fabricated to provide a sample that could be measured and that could be modeled to determine how well the modeling agrees with the measured data.

Figure 3B:
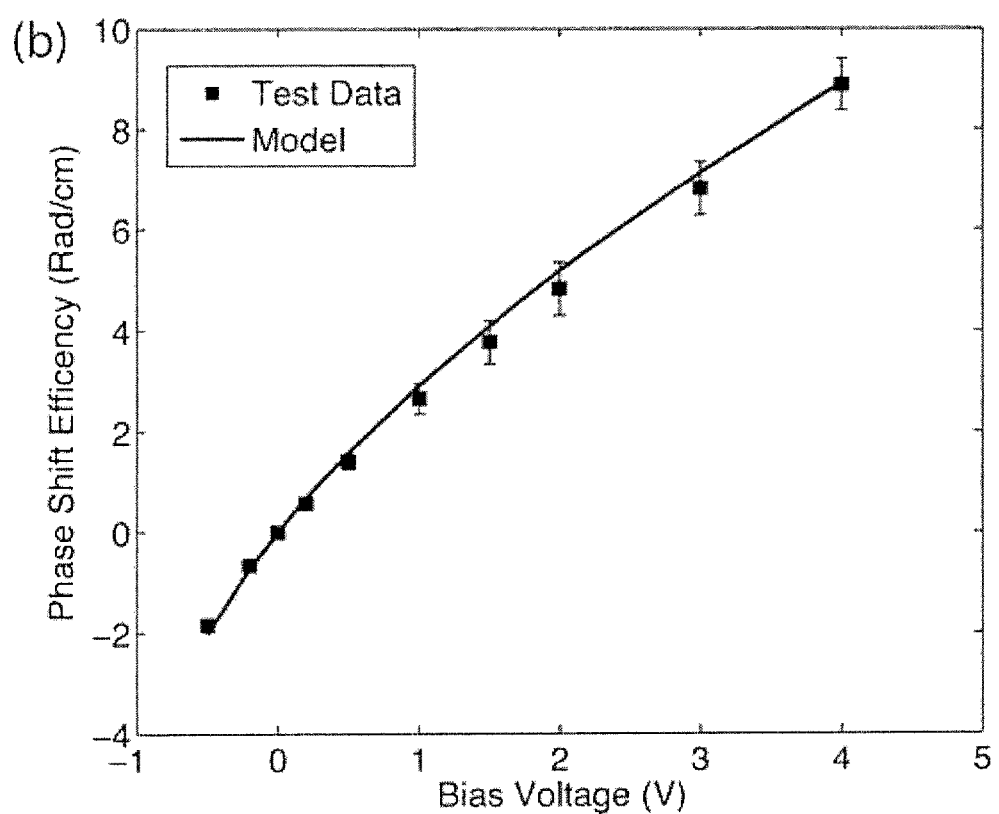
FIG. 3B is a graph showing the measured and simulated phase shift as a function of bias voltage.
Figure 4A:
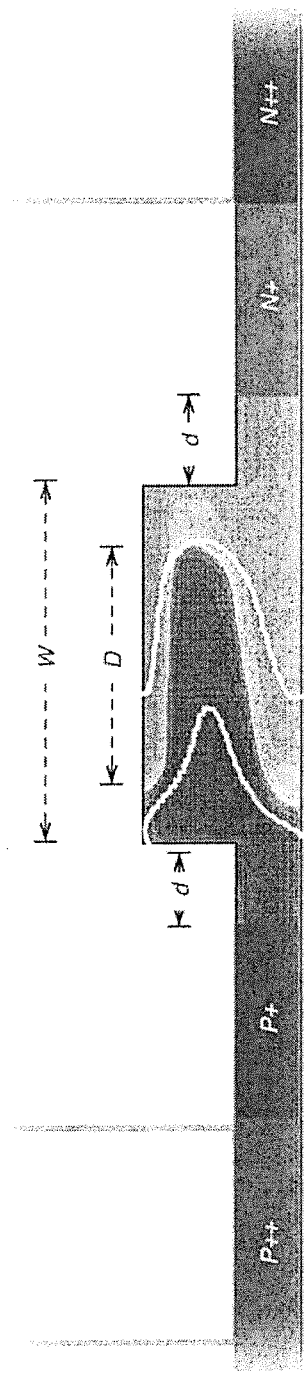
FIG. 4A is a diagram showing the configuration of the described phase shifter. The white lines show the depletion region at 3V reverse bias.

FIG. 3B is a graph showing the measured and simulated phase shift as a function of bias voltage.

Figure 3C:
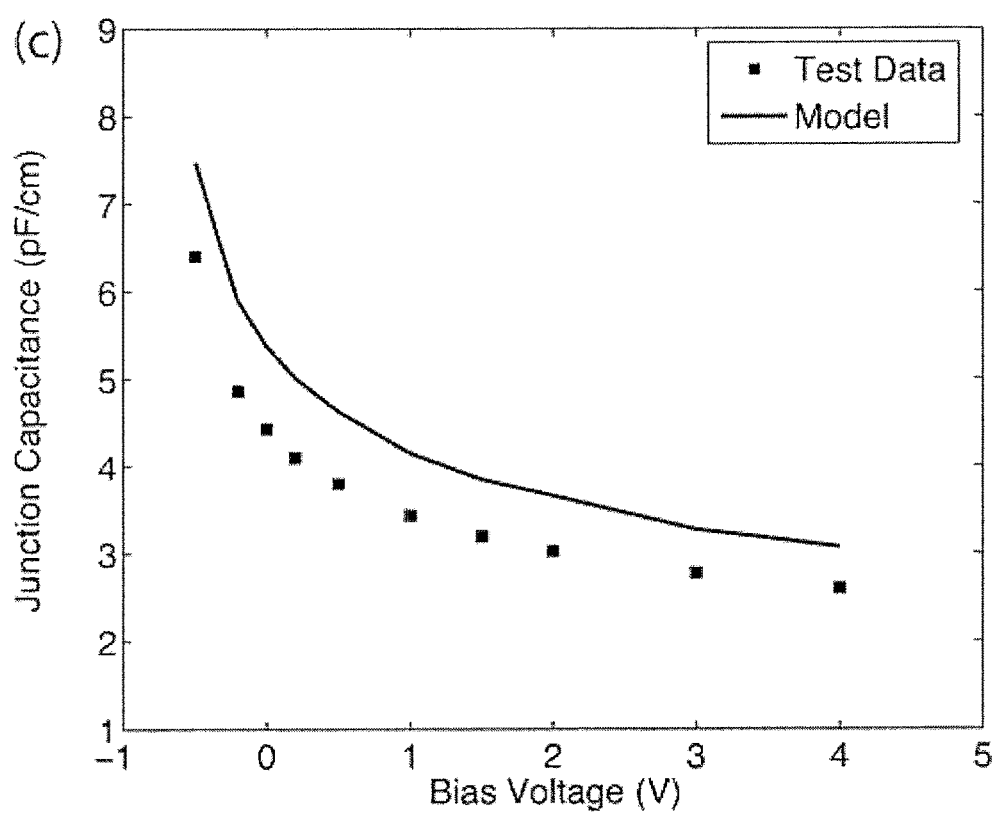
FIG. 3C is a graph showing the measured and simulated junction capacitance as a function of bias voltage.

FIG. 3C is a graph showing the measured and simulated junction capacitance as a function of bias voltage.

Figure 3D:
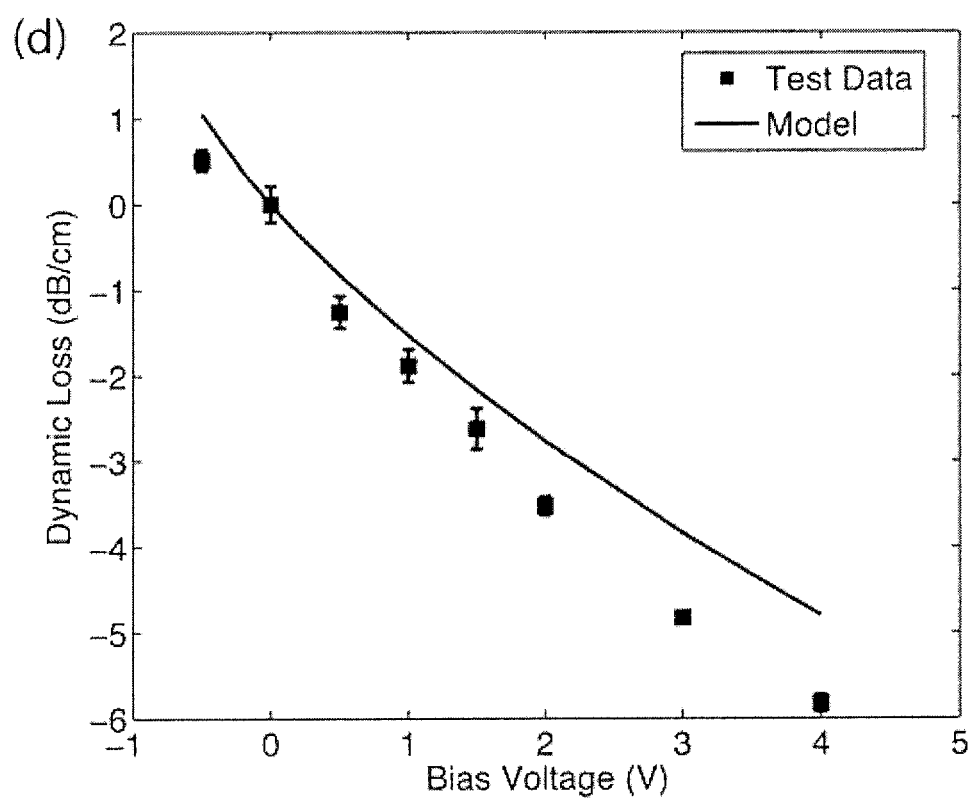
FIG. 3D is a graph showing the measured and simulated dynamic loss as a function of bias voltage.

FIG. 3D is a graph showing the measured and simulated dynamic loss as a function of bias voltage.

The PN junction is reverse biased for positive bias voltage in the plots. As we can see, the predicted phase shift efficiency is in very good agreement with the experiment data. We note that in our model, due to incomplete ionization, the phase shift predicted is lowered by 15%. This is in nearly perfect agreement with the measured data, as a result of this correction. Slight discrepancies are seen in other metrics; the optical loss (both dynamic and static) is around 22% higher than expected, and the capacitance is 18% lower than expected.

S Junction Performance Analysis

The performance of the phase shifter is analyzed based on the calibrated model. Our investigation focused on the effects of waveguide width and overlap ratio on the metrics of the phase shifter. We show that by tuning the waveguide width and implantation overlap ratio, the VπL, loss, and bandwidth of the phase shifter can be readily tuned to meet the requirement of different types of devices. The final junction performance reported here are projected from the model presented above by assuming the optical loss will be 22% higher and capacitance 18% lower than the model, as calibrated from the simulation results compared to observed data.

The configuration of the phase shifter is shown in FIG. 4A. The width of the rib waveguide is W and the slab height is 90 nm. In different embodiments, W was 500 nm, 600 nm, 700 nm and 800 nm. The implantation overlap is D (defined by the boron and phosphorus implantation masks). D is kept to be at least 100 nm less than W, ensuring at least 50 nm P and N type doped margin in the waveguide. Intermediate implantations P+ and N+ targeting at concentration of 1.5E19 are applied in the slab silicon to improve the conductivity. The P+ and N+ implantations are placed 200 nm away from the edge of the waveguide to reduce the extra optical loss. Electrodes are placed 700 nm away from the waveguide.

FIG. 4B through FIG. 4E show the simulated performance of the phase shifter for different waveguide width W and overlapping ratio D/W. For each waveguide width, the modulation efficiency VπL and optical loss decreases as the overlapping percentage increase. For a 600 nm waveguide, 0.3V·cm VπL and 20 dB/cm loss is achieved for a 0.8 overlapping ratio. This is as expected since a longer length of implantations overlapping results in a larger PN junction area, and therefore stronger interaction with the optical mode. For the same overlapping ratio, a wider waveguide appears to have lower VπL value, because the optical mode is more concentrated in the core of the waveguide. The optical loss decreases as the overlap ratio increases. This is because in the overlap region, P and N type dopant compensate each other, resulting in a lower effective doping level and a reduced optical loss. The non-planar junction interface in the overlap region can look like the English Letter "C" or the English letter "U" as is seen in FIG. 4A. In. FIG. 4A, the p-type region is on the concave side of the non-planar junction interface and the n-type region is on the convex side of the non-planar junction interface. It is believed that it is also possible to construct similar p-n junctions in which the n-type region is on the concave side of the non-planar junction interface and the p-type region is on the convex side of the non-planar junction interface, e.g., a non-planar junction interface that curves in the opposite direction to that shown in FIG. 4A. In other embodiments, a non-planar junction that has the shape of the English letter "S" can be fabricated.

The intrinsic bandwidth of the phase shifter is estimated by the junction capacitance and series resistance $f_{3dB}=1/(2\pi RC)$. The junction capacitance is obtained by a small signal AC simulation in Sentaurus Device, and the series resistance is estimated by adding the resistance in the silicon slab and the marginal region of the waveguide core. The resulting intrinsic bandwidth is plotted in FIG. 4E. As we can see in FIG. 4D, as the waveguide width and overlap ratio increase, the bandwidth decreases considerably, mainly due to the increased capacitance. For 600 nm waveguide width, and 0.8 overlap ratio, a compelling intrinsic bandwidth of 42 GHz can still be obtained. If needed, higher bandwidth can be readily achieved.

Figure 4C:
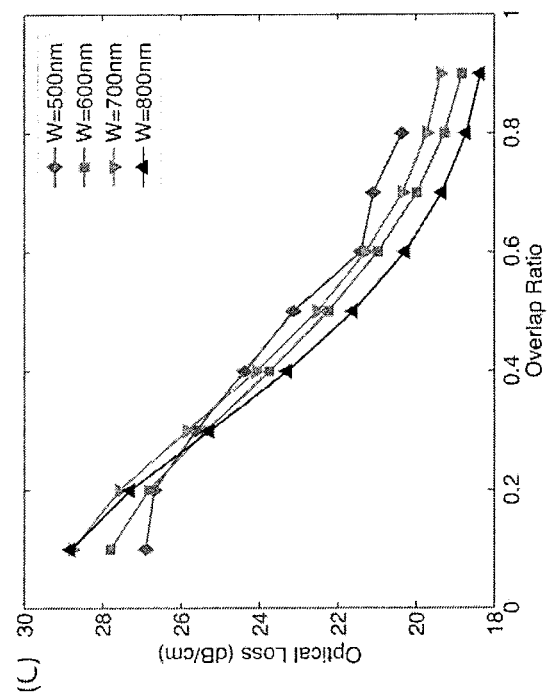
FIG. 4C is a graph illustrating the optical loss as a function of waveguide width and overlap ratio.
Figure 4B:
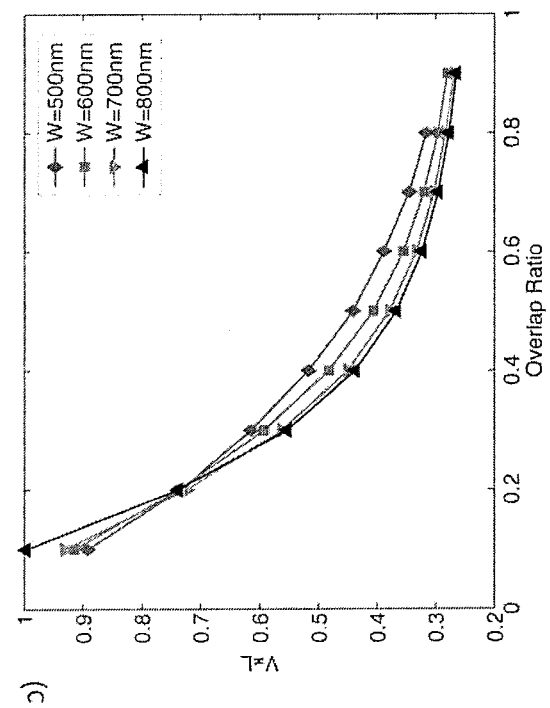
FIG. 4B is a graph illustrating the projected $V_\pi L$ as a function of waveguide width and overlap ratio.
Figures 4D, 4E:
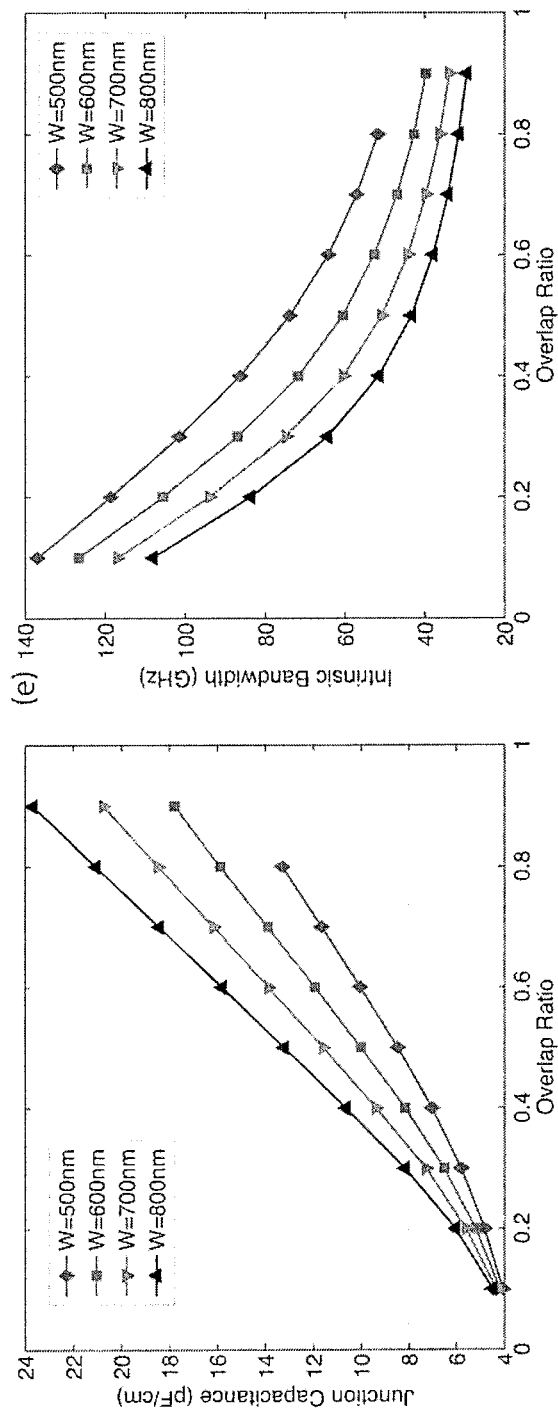
FIG. 4D is a graph illustrating the junction capacitance as a function of waveguide width and overlap ratio.
FIG. 4E is a graph illustrating the intrinsic bandwidth as a function of waveguide width and overlap ratio.

Turning to FIG. 4B and FIG. 4C respectively, the projected low VπL of 0.3V·cm and optical loss of 20 dB/cm is a significant improvement over the current record 0.62V·cm, 36 dB/cm in both aspects, for a geometry that does not require ultra-high resolution inter-digitation.

We have described one embodiment of an optical modulator using a semiconductor, for example silicon, waveguide with a non-planar PN junction that is formed when the p-type region has a portion that protrudes into the n-type region within the waveguide, as illustrated in the device cross-sections shown in FIGS. 1A and 4A. The resulting non-planar junction interface, when viewed in the lateral cross-section of the waveguide, has an enhanced overlap area with an optical mode of the waveguide as compared to a planar PN junction, resulting in greater modulation efficiency.

Figure 7:
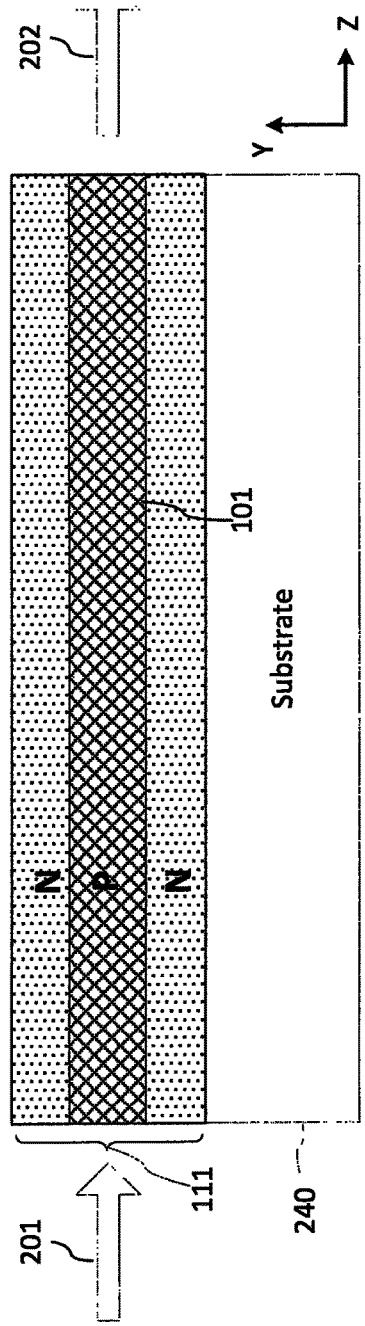
FIG. 7 is a schematic diagram showing p-type and n-type regions in a longitudinal cross-section for an embodiment of the phase shifter of FIGS. 1A and 4A with uniform doping profile along the length dimension.

Turning now to FIG. 7, the p-type and n-type regions of an optical waveguide 111 are schematically shown in a longitudinal cross-section extending along the length dimension of the waveguide (Z-axis) for one embodiment of the waveguide modulator with a non-planar junction interface. The figure corresponds to a cross-section through the middle of the implantation overlap region I that is shown in FIG. 1A, and also shows substrate 240 upon which the waveguide is disposed. The illustrated embodiment may be formed with the example implantation process described hereinabove applied uniformly along the whole length of the waveguide, resulting in the p-type protrusion region 101 extending along the whole waveguide length, forming a uniform NPN type structure along the length dimension of the waveguide. Here, arrows 201 and 202 indicate the direction of light propagation in the modulator, which is along the waveguide length dimension, with arrow 201 representing input light and arrow 202 representing input light.

The modulation efficiency may be further enhanced by making the PN junction interface to undulate or meander within the waveguide along the length dimension thereof so as to increase the mode-junction overlap volume in the waveguide.

Turning now to FIGS. 8-12, there is schematically illustrated one such embodiment 200 wherein the p-type region and n-type region of a semiconductor waveguide 205 include a plurality of interlocking protrusions 251 and 261. These interlocking p-type and n-type protrusions define a non-planar PN junction interface 203 that meanders in both lateral (FIGS. 11, 12) and longitudinal (FIG. 8) cross-sections of the waveguide, thereby further enhancing the fraction of the waveguide's volume that could be modulated by an applied electrical signal.

Referring first to FIG. 8, there is shown a longitudinal cross-section of the waveguide modulator 200 along its optical axis. Waveguide 205 has a plurality of first regions 210 wherein p-type region protrusions 251 approximately mid-height of the waveguide 2015 are interposed between portions of the n-type region in the vertical or height dimension to define an NPN structure, and are interleaved with n-type region protrusions 261 formed in second regions 220. The first regions 210 are interleaved with the second regions 220, in which n-type region protrusions 261 are formed approximately mid-height of the waveguide 2015 interposed between portions of the p-type region to define a PNP structure in the vertical or height dimension. This interlocking arrangement of the p-type and n-type protrusions results in a chess-board like pattern of p-type areas and n-type areas seen in the longitudinal cross-section of the device. Although FIG. 8 shows three first regions 210 and three second regions 220 in an interleaved arrangement, this is by way of example only and the waveguide modulator 200 may include from as few as one pair of the first and second regions to tens or more of each of the first and second regions. The first and second regions 210, 220 may also be referred to herein as the first and second doping overlap regions, respectively.

FIG. 9 illustrates a plan view of the waveguide modulator 200 of FIG. 8 in one embodiment thereof. FIG. 8 represents the view in a cross-section along AA line in FIG. 9. In the embodiment illustrated in FIG. 9 waveguide 205 is a slab waveguide with rib 230 defined by a first side wall 231 and a second side wall 232, which are also indicated in FIGS. 11 and 12. P-type contact region 255 and n-type contact region 265 are disposed at opposite sides of the rib and are in electrical communication with the p-type and n-type regions of the waveguide, respectively. The p-type region 250 may include the first side wall 231, or at least a portion of its height, and a proximate thereto region of the rib extending contiguously along the rib length (Z-axis). The n-type region may include the second side wall 232, or at least a portion of its height, and a proximate thereto region of the rib extending contiguously along the rib length. FIG. 9 also indicates interleaved first and second regions 210, 220 defining the junction interface 203 that meanders in the longitudinal direction (Z-axis). Five first regions 210 and four second regions 220 are shown by way of example. Note that only the top view of the p-type and n-type regions is shown, with the p-type protrusions 251 and n-type protrusions 252 positioned approximately mid-height of the rib 230 and are not visible in this plan view. Here the term 'mid-height' is used to mean the presence of other material both over and under the feature within the rib height rather than the actual middle point. The p-type protrusions are located in the first regions 210 extending from near the first side wall 231 towards the second side wall 232, as illustrated in FIG. 11. The n-type protrusions are located in the second regions 220 extending from near the second side wall 232 towards the first side wall 231, as illustrated in FIG. 12. FIG. 10 illustrates a three-dimensional perspective view of a section of the waveguide 205 indicated in FIG. 9 at 233. P-type and n-type regions are indicated in FIG. 10 with corresponding "P" and "N" characters and are separated by the junction interface 203. Lighter area at the junction interface 203 indicates the depletion region.

Turning now to FIGS. 11 and 12, they illustrate spatial profiles of the p-type and n-type regions 250, 260 of the waveguide as seen in lateral cross-sections thereof at two different locations along the waveguide length, through the first and second doping overlap regions respectively. FIG. 11 illustrates the spatial doping profiles in the first cross-section taken through one of the first regions 210 along the BB line in FIG. 9. It shows an NPN type doping profile in the height dimension similar to that illustrated in FIGS. 1A and 4A, which in this embodiment is the profile of one of the p-type protrusions 251 interposed between two portions of the n-type region 260. The p-type protrusion 251 in the shown cross-section defines an approximately 180° bend 230a in the PN-junction interface 230, with the p-type region on the concave side thereof. FIG. 12 illustrates the view in the second cross-section taken across one of the second regions 220 along the BB line in FIG. 9. It shows an inverted, PNP type, doping profile as defined by the corresponding n-type protrusion 261 interposed between two portions of the p-type region 250 in the height dimension. The corresponding cross-section of the PN-junction interface 203 is indicated at 203b and forms an inverted C-shaped bend of the opposite to bend 203a curvature, with the n-type region on the concave side thereof. The p-contact region 255 in the slab portion of the waveguide provides ohmic electrical contact to the p-region 250 of the waveguide, including the plurality of the p-type protrusions 251, while the n-contact region 265 in the slab portion on the opposite side of the waveguide provides ohmic electrical contact to the n-region 260 of the waveguide, including the plurality of the n-type protrusions 261.

Turning now to FIGS. 13A-D, an optical waveguide with non-planar PN junction interfaces formed of the type described hereinabove with reference to FIGS. 8-12 may be fabricated using a two-stage implantation process in which first and second regions 251, 252 are implanted separately. Prior to performing the implantation, the position of the first and second regions in the waveguide may be defined using selective masking to shield either one of the pluralities of the first and second regions from implantation.

One of the two stages may include implanting n-type dopants into the first implantation overlap regions 210 at two different energies so at to form, in each of the first implantation overlap regions, an n-type dopant distribution with two peaks in a direction normal to the substrate, and implanting the p-type dopants into the first implantation overlap regions 210 so at to form a p-type dopant distribution having a peak that is located between the two peaks of the n-type dopant distribution in the direction normal to the substrate. In the embodiment wherein the waveguide is formed of silicon the p-type dopant may be for example boron, and the n-type dopant may be for example phosphorus or arsenic. The implantation at this stage may be performed generally as described hereinabove with reference to FIGS. 1A-4A. At this stage the second regions 220 may be shielded, as illustrated in FIGS. 13A and 13B by cross-dashed areas. FIG. 13A illustrates example masking during the implantation of the p-type dopants into the first regions 210 while FIG. 13B illustrates example masking during the implantation of the n-type dopants into the first regions 210.

The other of the two stages may include implanting the p-type dopants into the second implantation overlap regions 220 at two different energies so at to form, in each of the second implantation overlap regions a p-type dopant distribution with two peaks in the direction normal to the substrate, and implanting the n-type dopants into the second implantation overlap regions so at to form an n-type dopant distribution having a peak that is located between the two peaks of the p-type dopant distribution in the direction normal to the substrate. At this stage the first regions 210 may be shielded, as illustrated in FIGS. 13C and 13D by cross-dashed areas. FIG. 13C illustrates example masking during the implantation of the n-type dopants into the second regions 220 while FIG. 13D illustrates example masking during the implantation of the p-type dopants into the second regions 220. The first regions 210 may be referred to in this embodiment as the first PN implantation overlap regions. The first and second regions 210, 220 may be referred to in this embodiment as the first and second PN implantation overlap regions, respectively.

In one embodiment the slab region 275, which is to be p-doped to enable electrical contact to the p-side of the PN junction in the implantation overlap region of the waveguide, may be also shielded during some or all of the p-implantation steps. Similarly the slab region 285, which is to be n-doped to enable electrical contact to the n-side of the PN junction in the implantation overlap region of the waveguide, may be also shielded during some or all of the n-implantation steps. In some embodiments the slab regions 275 and 285 may be implanted separately from the implantation overlap regions 210 and 220. After the two implantation stages are completed, the device may undergo rapid thermal anneal as described hereinabove.

In some embodiments the implantation steps may be performed on a planar structure prior to the anisotropic etch step that defines the slab waveguide geometry.

It will be appreciated that the interlocking structure of the p-type and n-type regions in the waveguide of the type described hereinabove with reference to FIGS. 8-12 may also be formed by processes other than implantation, for example using a sequence of selective etching and re-growth steps to form a three-layer structure within interdigitated P and N doping the waveguide.

Application Examples

FIG. 5A is an illustration of a Mach Zehnder interferometer built using devices fabricated according to principles of the invention. In FIG. 5A a Mach Zehnder interferometer (MZI) modulator using the described phase shifter has a light input (optical input 510) from the left waveguide and an output (optical output 530) from the right. The phase shifters 520 are loaded on both arms.

FIG. 5B is a diagram illustrating the detailed doping mask for the phase shifter, in which N and P implantations overlap in the center of the waveguide.

FIG. 5C is a diagram illustrating a more detailed view of a portion of the doping mask in FIG. 5B.

Figure 5D:
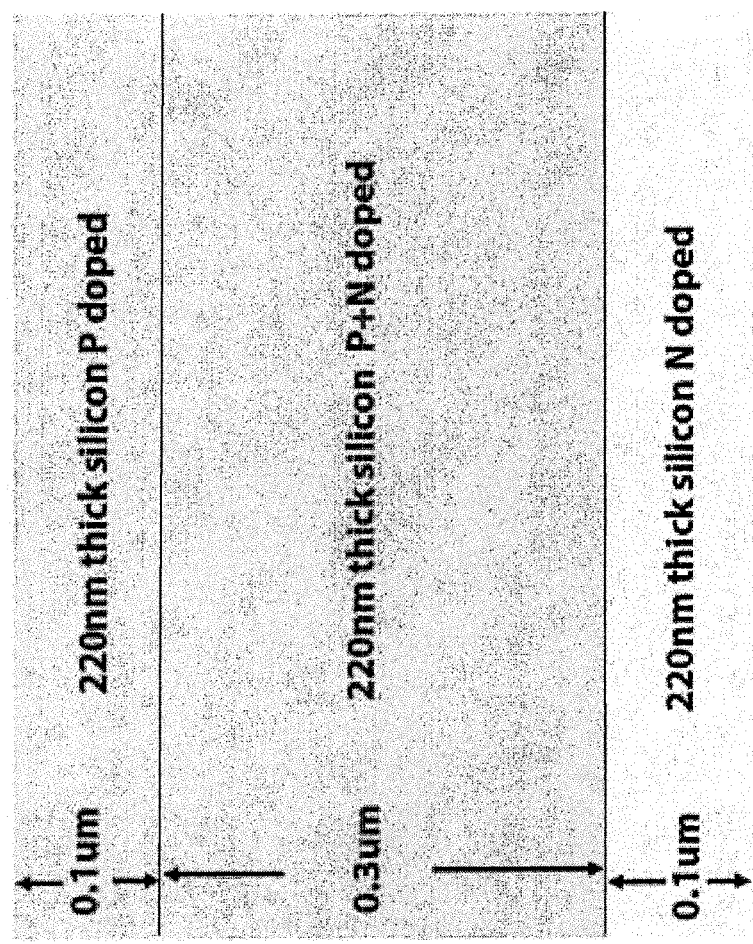
FIG. 5D is a diagram illustrating the dimensions of layers in the center of the waveguide.

FIG. 5D is a diagram illustrating the dimensions of layers in the center of the waveguide. The dimensions presented in the diagrams are typical dimensions in a preferred embodiment.

Figure 6:
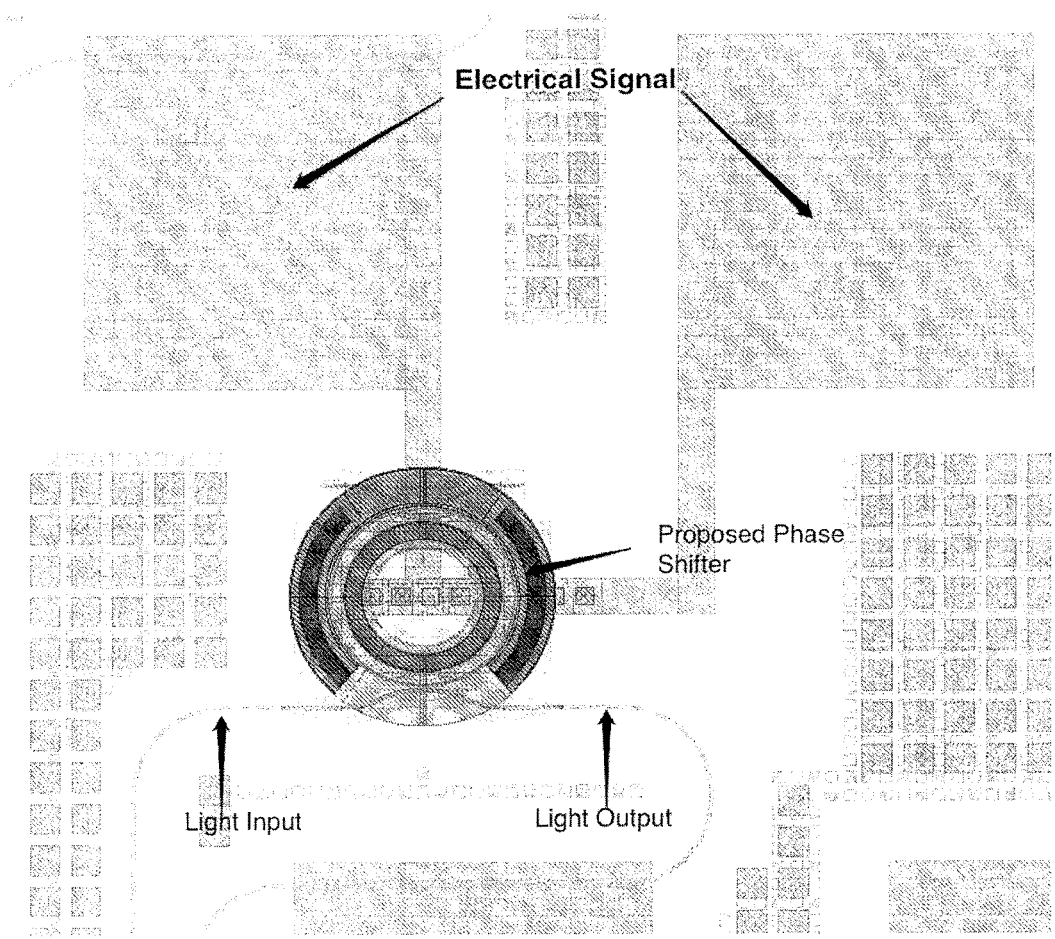
FIG. 6 is an illustration of a ring modulator constructed using devices fabricated according to principles of the invention.

FIG. 6 is an illustration of a ring modulator constructed using devices fabricated according to principles of the invention. In FIG. 6 there are shown electrical pads for communicating an electrical signal to a phase shifter (which in the embodiment illustrated has a circular configuration). Light circulating in the phase shifter can be modulated with the electrical signal that is provided at the electrical pads. There are shown a light input port and a light output port at opposite ends of an optical waveguide that is in optical communication with the phase shifter. Light that enters on the optical input port passes through the phase shifter and interacts by evanescent waves with modulated light circulating in the phase shifter, thereby modulating the light that enters at the optical input port. The modulated light exits at the optical output port and can be transmitted or otherwise used outside the modulator.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the example embodiments as illustrated in the drawings, it will be understood by one skilled in the art that various changes in detail may be affected therein without departing from the spirit and scope of the invention as defined by the claims.

What is claimed is:

1. An optical modulator comprising: a substrate; an optical waveguide disposed upon the substrate and characterized by a width dimension, a length dimension, and a height dimension, the height dimension being perpendicular to the substrate; a p-type region of semiconductor material disposed within the optical waveguide; an n-type region of semiconductor material disposed within the optical waveguide; wherein the n-type region and the p-type region share a non-planar junction interface that is shaped so as to enhance an overlap between an optical mode in the optical waveguide and the junction interface when the optical modulator semiconductor device is operational; and wherein at least one of the p-type region and the n-type region comprises a protrusion interposed in the height dimension between portions of the other of the p-type region and the n-type region; wherein the p-type region comprises a plurality of p- type protrusions spaced along the length dimension, each of the p-type protrusions interposed in the height dimension between portions of the n-type region, and wherein the n-type region comprises a plurality of n-type protrusions interleaved with the p-type protrusions along the length dimension, each of the n-type protrusions interposed in the height dimension between portions of the p-type region.

2. The optical modulator of claim 1 wherein the optical waveguide includes an N and P implantation overlap region comprising at least a portion of the non-planar junction interface defined by the protrusion region.

3. The optical modulator of claim 1, wherein the non-planar junction interface comprises a convex side and a concave side as viewed in a cross-section taken perpendicular to a light propagation direction in the optical waveguide, wherein the p-type region is on the concave side of the non-planar junction interface and the n-type region is on the convex side of the non-planar junction interface.

4. The optical modulator of claim 1, wherein the non-planar junction interface comprises a convex side and a concave side as viewed in a cross-section taken perpendicular to a light propagation direction in the optical waveguide, wherein the n-type region is on the concave side of the non-planar junction interface and the p-type region is on the convex side of the non-planar junction interface.

5. The optical modulator of claim 1 including a p-type contact region extending along the optical waveguide in electrical communication with the p-type region and an n-type contact region extending along the optical waveguide across from the p-type region in electrical communication with the n-type region.

6. The optical modulator of claim 1, wherein in a first cross-section of the optical waveguide the p-type region is on a concave side of the non-planar junction interface and the n-type region is on a convex side of the non-planar junction interface, and wherein in a second cross-section the n-type region is on a concave side of the non-planar junction interface and the p-type region is on a convex side of the non-planar junction interface, wherein the first and second cross-sections are perpendicular to a light propagation direction in the optical waveguide at two different locations in the optical waveguide along the direction of light propagation.

7. The optical modulator of claim 1 including a p-type contact region extending along the optical waveguide in electrical communication with the p-type protrusions and an n-type contact region extending along the optical waveguide in electrical communication with the n-type protrusions.

8. The optical modulator of claim 1 wherein the optical waveguide comprises a rib defined by a first side wall and a second side wall, wherein the p-type region comprises at least a portion of the first side wall extending contiguously along a length of the rib, wherein the n-type region comprises at least a portion of the second side wall extending contiguously along the length of the rib, wherein the p-type protrusions extend in a direction from the first side wall towards the second side wall, and wherein the n-type protrusions extend in a direction from the second wall towards the first side wall.

9. The optical modulator of claim 1 wherein the optical waveguide includes a plurality of first implantation overlap regions spaced along the length dimension and comprising the p-type protrusion and a plurality of second implantation overlap regions interleaved with the first implantation overlap regions and comprising the n-type protrusion.

10. The optical modulator of claim 1 wherein the semiconductor material comprises silicon.

11. The optical modulator of claim 10 wherein the p-type region is doped with boron and the n-type region is doped with at least one of phosphorous or arsenic.

12. A method of fabricating an optical modulator comprising: a) providing a semiconductor material upon a planar substrate; and, b) forming an optical waveguide with the semiconductor material, the optical waveguide comprising a p-type region and an n-type region defined therein so that at least one of the p-type region and the n-type region comprises a protrusion region interposed between portions of the other of the p-type region and the n-type region in a height dimension normal to the substrate, said protrusion region defining a non-planar junction interface between the n-type and p-type regions for enhancing an overlap between an optical mode of the optical waveguide and the non-planar junction interface; wherein b) comprises defining a slab waveguide structure in the semiconductor material; wherein b) includes implanting n-type and p-type dopants into the slab waveguide structure in multiple implantation steps to produce the n-type and p-type regions, respectively; wherein b) comprises defining an implantation overlap region in the slab waveguide structure, and wherein the step of implanting comprises implanting the n-type dopants and the p-type dopants into the implantation overlap region at different energies so at to form a first dopant distribution within the implantation overlap region with two peaks in a direction normal to the substrate, and implanting the other of the n-type dopants and p-type dopants at a third energy so at to form a second dopant distribution in the implantation overlap region, the second dopant distribution having a peak that is located between the two peaks of the first dopant distribution in the direction normal to the substrate.

13. The method of claim 12 further comprising providing a p-type contact region in electrical communication with the p-type region and an n-type contact region in electrical communication with the n-type region.

14. The method of claim 12 wherein b) comprises: b1) defining, in the slab waveguide structure, a plurality of first implantation overlap regions spaced along a length thereof and a plurality of second implantation overlap regions interleaved with the first implantation overlap regions; b2)

implanting the n-type dopants into the first implantation overlap regions at two different energies so at to form, in each of the first implantation overlap regions, an n-type dopant distribution with two peaks in a direction normal to the substrate, and implanting the p-type dopants into the first implantation overlap regions so at to form a p-type dopant distribution having a peak that is located between the two peaks of the n-type dopant distribution in the direction normal to the substrate; and, b3) implanting the p-type dopants into the second implantation overlap regions at two different energies so at to form, in each of the second implantation overlap regions a p-type dopant distribution with two peaks in the direction normal to the substrate, and implanting the n-type dopants into the second implantation overlap regions so at to form an n-type dopant distribution having a peak that is located between the two peaks of the p-type dopant distribution in the direction normal to the substrate.

15. The method of claim 14 comprising shielding the plurality of second implantation regions from implantation prior to b2), and shielding the plurality of second implantation regions from implantation prior to b3).

* * * * *